(12) United States Patent
Tourapis et al.

(10) Patent No.: US 11,843,783 B2
(45) Date of Patent: *Dec. 12, 2023

(54) PREDICTIVE MOTION VECTOR CODING

(71) Applicant: DOLBY LABORATORIES LICENSING CORPORATION, San Francisco, CA (US)

(72) Inventors: Alexandros Tourapis, Burbank, CA (US); Athanasios Leontaris, Burbank, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/082,142

(22) Filed: Dec. 15, 2022

(65) Prior Publication Data

US 2023/0117479 A1   Apr. 20, 2023

Related U.S. Application Data

(63) Continuation of application No. 17/332,028, filed on May 27, 2021, now Pat. No. 11,539,959, which is a
(Continued)

(51) Int. Cl.
*H04N 19/139* (2014.01)
*H04N 19/597* (2014.01)
(Continued)

(52) U.S. Cl.
CPC ......... *H04N 19/139* (2014.11); *H04N 19/103* (2014.11); *H04N 19/105* (2014.11);
(Continued)

(58) Field of Classification Search
CPC .. H04N 19/103; H04N 19/105; H04N 19/139; H04N 19/152; H04N 19/159;
(Continued)

(56) References Cited

U.S. PATENT DOCUMENTS 4,654,696 A  3/1987 Dayton et al.
4,903,317 A  2/1990 Wu et al.
(Continued)

FOREIGN PATENT DOCUMENTS

CA  2127151  3/1995
CN  1465193  12/2003
(Continued)

OTHER PUBLICATIONS

"IEEE Standard Specifications for the Implementations of 8X8 Inverse Discrete Cosine Transform," IEEE Std 1180-1990, The Institute of Electrical and Electronics Engineers, Inc., 12 pages (1991).
(Continued)

*Primary Examiner* — Behrooz M Senfi

(57) ABSTRACT

Overlapped block disparity estimation and compensation is described. Compensating for images with overlapped block disparity compensation (OBDC) involves determining if OBDC is enabled in a video bit stream, and determining if OBDC is enabled for one or more macroblocks that neighbor a first macroblock within the video bit stream. The neighboring macroblocks may be transform coded. If OBDC is enabled in the video bit stream and for the one or more neighboring macroblocks, predictions may be made for a region of the first macroblock that has an edge adjacent with the neighboring macroblocks. OBDC can be causally applied. Disparity compensation parameters or modes may be shared amongst views or layers. A variety of predictions may be used with causally-applied OBDC.

8 Claims, 15 Drawing Sheets

Related U.S. Application Data continuation of application No. 16/790,337, filed on Feb. 13, 2020, now Pat. No. 11,025,912, which is a continuation of application No. 16/517,382, filed on Jul. 19, 2019, now Pat. No. 10,645,392, which is a continuation of application No. 16/298,051, filed on Mar. 11, 2019, now Pat. No. 10,574,994, which is a continuation of application No. 15/825,612, filed on Nov. 29, 2017, now Pat. No. 10,321,134, which is a continuation of application No. 15/496,795, filed on Apr. 25, 2017, now Pat. No. 9,843,807, which is a continuation of application No. 15/164,423, filed on May 25, 2016, now Pat. No. 9,667,993, which is a continuation of application No. 14/723,693, filed on May 28, 2015, now Pat. No. 9,357,230, which is a continuation of application No. 14/242,975, filed on Apr. 2, 2014, now Pat. No. 9,060,168, which is a continuation of application No. 13/057,204, filed as application No. PCT/US2009/052650 on Aug. 4, 2009, now Pat. No. 9,445,121.

(60) Provisional application No. 61/086,056, filed on Aug. 4, 2008.

(51) Int. Cl.
| | | |
|---|---|---|
| *H04N 19/176* | (2014.01) | |
| *H04N 19/46* | (2014.01) | |
| *H04N 19/30* | (2014.01) | |
| *H04N 19/61* | (2014.01) | |
| *H04N 19/103* | (2014.01) | |
| *H04N 19/573* | (2014.01) | |
| *H04N 19/513* | (2014.01) | |
| *H04N 19/583* | (2014.01) | |
| *H04N 19/577* | (2014.01) | |
| *H04N 19/182* | (2014.01) | |
| *H04N 19/105* | (2014.01) | |
| *H04N 19/152* | (2014.01) | |
| *H04N 19/159* | (2014.01) | |
| *H04N 19/184* | (2014.01) | |

(52) U.S. Cl.
CPC ......... *H04N 19/152* (2014.11); *H04N 19/159* (2014.11); *H04N 19/176* (2014.11); *H04N 19/182* (2014.11); *H04N 19/30* (2014.11); *H04N 19/46* (2014.11); *H04N 19/521* (2014.11); *H04N 19/573* (2014.11); *H04N 19/577* (2014.11); *H04N 19/583* (2014.11); *H04N 19/597* (2014.11); *H04N 19/61* (2014.11); *H04N 19/184* (2014.11)

(58) Field of Classification Search
CPC .. H04N 19/176; H04N 19/182; H04N 19/184; H04N 19/30; H04N 19/46; H04N 19/521; H04N 19/573; H04N 19/577; H04N 19/583; H04N 19/597; H04N 19/61
USPC .................................................. 375/240.16
See application file for complete search history.

(56) References Cited

U.S. PATENT DOCUMENTS

| | | |
|---|---|---|
| 4,982,285 A | 1/1991 | Sugiyama |
| 4,985,768 A | 1/1991 | Sugiyama |
| 5,231,484 A | 7/1993 | Gonzales et al. |
| 5,294,974 A | 3/1994 | Naimpally et al. |
| 5,301,019 A | 4/1994 | Citta |
| 5,311,310 A | 5/1994 | Jozawa et al. |
| 5,374,958 A | 12/1994 | Yanagihara |
| 5,408,270 A | 4/1995 | Lim |
| 5,412,430 A | 5/1995 | Nagata |
| 5,426,463 A | 6/1995 | Reninger et al. |
| 5,438,374 A | 8/1995 | Yan et al. |
| 5,442,407 A | 8/1995 | Iu |
| 5,446,498 A | 8/1995 | Boon |
| 5,465,119 A | 11/1995 | Demos |
| 5,475,435 A | 12/1995 | Yonemitsu et al. |
| 5,602,593 A | 2/1997 | Katto |
| 5,659,363 A | 8/1997 | Wilkinson |
| 5,661,524 A | 8/1997 | Murdock et al. |
| 5,661,525 A | 8/1997 | Kovacevic et al. |
| 5,668,600 A | 9/1997 | Lee |
| 5,699,128 A | 12/1997 | Hayashi |
| 5,737,032 A | 4/1998 | Stenzel et al. |
| 5,742,343 A | 4/1998 | Haskell et al. |
| 5,748,903 A | 5/1998 | Agarwal |
| 5,764,805 A | 6/1998 | Martucci |
| 5,786,860 A | 7/1998 | Kim et al. |
| 5,796,438 A | 8/1998 | Hosono |
| 5,812,194 A | 9/1998 | Wilkinson |
| 5,815,646 A | 9/1998 | Purcell et al. |
| 5,825,421 A | 10/1998 | Tan |
| 5,825,680 A | 10/1998 | Wheeler et al. |
| 5,835,498 A | 11/1998 | Kim et al. |
| 5,852,565 A | 12/1998 | Demos |
| 5,877,754 A | 3/1999 | Keith et al. |
| 5,920,353 A | 7/1999 | Diaz et al. |
| 5,926,225 A | 7/1999 | Fukuhara et al. |
| 5,963,257 A | 10/1999 | Katata et al. |
| 5,974,184 A | 10/1999 | Eifrig et al. |
| 5,982,438 A | 11/1999 | Lin et al. |
| 5,987,179 A | 11/1999 | Rick et al. |
| 5,987,180 A | 11/1999 | Reitmeier |
| 5,988,863 A | 11/1999 | Demos |
| 5,995,095 A | 11/1999 | Ratakonda |
| 6,005,626 A | 12/1999 | Ding |
| 6,020,934 A | 2/2000 | Greenfield et al. |
| 6,023,301 A | 2/2000 | Katata et al. |
| 6,023,553 A | 2/2000 | Boyce et al. |
| 6,026,183 A | 2/2000 | Talluri |
| 6,043,846 A | 3/2000 | Shen et al. |
| 6,069,914 A | 5/2000 | Cox |
| 6,097,842 A | 8/2000 | Suzuki et al. |
| 6,115,421 A | 9/2000 | Katta et al. |
| 6,163,574 A | 12/2000 | Yagasaki |
| 6,172,768 B1 | 1/2001 | Yamada et al. |
| 6,175,593 B1 | 1/2001 | Kim et al. |
| 6,215,824 B1 | 4/2001 | Assuncao |
| 6,236,727 B1 | 5/2001 | Ciacelli et al. |
| RE37,222 E | 6/2001 | Yonemitsu et al. |
| 6,268,886 B1 | 7/2001 | Choi |
| 6,301,304 B1 | 10/2001 | Jing et al. |
| 6,327,602 B1 | 12/2001 | Kim |
| 6,332,194 B1 | 12/2001 | Bloom et al. |
| 6,404,813 B1 | 6/2002 | Haskell et al. |
| 6,430,222 B1 | 8/2002 | Okada |
| 6,430,316 B1 | 8/2002 | Wilkinson |
| 6,434,196 B1 | 8/2002 | Sethuraman et al. |
| 6,442,203 B1 | 8/2002 | Demos |
| 6,507,615 B1 | 1/2003 | Tsujii et al. |
| 6,614,845 B1 | 9/2003 | Azadegan |
| 6,629,104 B1 | 9/2003 | Parulski et al. |
| 6,650,708 B1 | 11/2003 | Ohgose |
| 6,654,417 B1 | 11/2003 | Hui |
| 6,654,420 B1 | 11/2003 | Snook |
| 6,697,433 B1 | 2/2004 | Isu |
| 6,728,317 B1 | 4/2004 | Demos |
| 6,765,964 B1 | 7/2004 | Conklin |
| 6,807,231 B1 | 10/2004 | Weigand et al. |
| 6,816,552 B2 | 11/2004 | Demos |
| 6,823,087 B1 | 11/2004 | Liu et al. |
| 6,850,564 B1 | 2/2005 | Pejhan et al. |
| 6,900,846 B2 | 5/2005 | Lee et al. |
| 6,909,748 B2 | 6/2005 | Dinerstein |
| 6,925,126 B2 | 8/2005 | Lan et al. |
| 6,957,350 B1 | 10/2005 | Demos |
| 6,983,021 B2 | 1/2006 | Pesquet-Popesc et al. |
| 7,164,717 B2 | 1/2007 | Katsavounidis et al. |

(56) References Cited

U.S. PATENT DOCUMENTS

| | | |
|---|---|---|
| 7,263,128 B2 | 8/2007 | Youn |
| 7,266,149 B2 | 9/2007 | Holcomb et al. |
| 7,266,150 B2 | 9/2007 | Demos |
| 7,280,599 B2 | 10/2007 | Karczewicz et al. |
| 7,295,612 B2 | 11/2007 | Haskell et al. |
| 7,545,863 B1 | 6/2009 | Haskell et al. |
| 7,606,312 B2 | 10/2009 | Conklin |
| 7,733,960 B2 | 6/2010 | Kondo et al. |
| 7,894,524 B2 | 2/2011 | Demos |
| 8,085,845 B2 | 12/2011 | Tourapis |
| 8,149,916 B2 | 4/2012 | Ghanbari |
| 8,340,177 B2 | 12/2012 | Li |
| 8,379,720 B2 | 2/2013 | Demos |
| 8,526,496 B2 | 9/2013 | Demos |
| 8,542,738 B2 | 9/2013 | Demos |
| 9,060,168 B2 | 6/2015 | Tourapis |
| 9,357,230 B2 * | 5/2016 | Tourapis ............... H04N 19/105 |
| 9,445,121 B2 | 9/2016 | Tourapis |
| 9,667,993 B2 * | 5/2017 | Tourapis ............... H04N 19/139 |
| 9,843,807 B2 * | 12/2017 | Tourapis ............... H04N 19/521 |
| 10,321,134 B2 * | 6/2019 | Tourapis ............... H04N 19/597 |
| 10,574,994 B2 * | 2/2020 | Tourapis ............... H04N 19/103 |
| 10,645,392 B2 * | 5/2020 | Tourapis ............... H04N 19/583 |
| 11,025,912 B2 * | 6/2021 | Tourapis ............... H04N 19/105 |
| 11,539,959 B2 * | 12/2022 | Tourapis ................ H04N 19/46 |
| 2001/0028725 A1 | 10/2001 | Nakagawa et al. |
| 2002/0154693 A1 | 10/2002 | Demos |
| 2002/0186766 A1 | 12/2002 | Adelaide |
| 2003/0112863 A1 | 6/2003 | Demos |
| 2003/0112871 A1 | 6/2003 | Demos |
| 2003/0112873 A1 | 6/2003 | Demos |
| 2003/0177255 A1 | 9/2003 | Yun |
| 2003/0202588 A1 | 10/2003 | Yu |
| 2004/0005004 A1 | 1/2004 | Demos |
| 2004/0062305 A1 | 4/2004 | Dambrackas |
| 2004/0091051 A1 | 5/2004 | Youn |
| 2004/0165664 A1 | 8/2004 | Karczewicz et al. |
| 2004/0184666 A1 | 9/2004 | Sekiguchi et al. |
| 2004/0252896 A1 | 12/2004 | Lee et al. |
| 2005/0025243 A1 | 2/2005 | Sohn et al. |
| 2005/0053143 A1 | 3/2005 | Holcomb |
| 2005/0078755 A1 | 4/2005 | Woods et al. |
| 2005/0254649 A1 | 11/2005 | Demos |
| 2006/0008003 A1 | 1/2006 | Ji et al. |
| 2006/0083310 A1 | 4/2006 | Zhang |
| 2006/0262853 A1 | 11/2006 | Li et al. |
| 2007/0047648 A1 | 3/2007 | Tourapis et al. |
| 2007/0263727 A1 | 11/2007 | Sekiguchi et al. |
| 2007/0286288 A1 | 12/2007 | Smith et al. |
| 2008/0043848 A1 | 2/2008 | Kuhn |
| 2008/0240242 A1 | 10/2008 | Lainema |
| 2009/0086816 A1 | 4/2009 | Leontaris et al. |
| 2009/0213932 A1 | 8/2009 | Haskell et al. |
| 2010/0215101 A1 | 8/2010 | Jeon et al. |
| 2011/0142132 A1 | 6/2011 | Tourapis et al. |
| 2012/0224623 A1 | 9/2012 | Cho et al. |
| 2013/0070858 A1 | 3/2013 | Demos |
| 2013/0077692 A1 | 3/2013 | Demos |
| 2013/0177066 A1 | 7/2013 | Ye et al. |
| 2013/0322534 A1 | 12/2013 | Demos |
| 2014/0098189 A1 | 4/2014 | Deng et al. |
| 2014/0153645 A1 | 6/2014 | Zhang |
| 2014/0211853 A1 | 7/2014 | Tourapis et al. |
| 2015/0264395 A1 | 9/2015 | Tourapis et al. |
| 2016/0269743 A1 | 9/2016 | Tourapis et al. |
| 2017/0230666 A1 | 8/2017 | Tourapis et al. |
| 2018/0084255 A1 | 3/2018 | Tourapis et al. |
| 2019/0208213 A1 | 7/2019 | Tourapis |
| 2019/0342558 A1 | 11/2019 | Tourapis et al. |
| 2020/0186806 A1 | 6/2020 | Tourapis et al. |
| 2021/0289210 A1 | 9/2021 | Tourapis et al. |

FOREIGN PATENT DOCUMENTS

| | | |
|---|---|---|
| CN | 1738434 | 2/2006 |
| EP | 0511778 | 11/1992 |
| EP | 0531041 | 3/1993 |
| EP | 0534350 | 3/1993 |
| EP | 0634871 | 1/1995 |
| EP | 0782343 | 7/1997 |
| EP | 1369820 | 12/2003 |
| JP | 02-192378 | 7/1990 |
| JP | 02-285816 | 11/1990 |
| JP | 05-037915 | 2/1993 |
| JP | 05-236456 | 9/1993 |
| JP | 06-165150 | 6/1994 |
| JP | 06-350995 | 12/1994 |
| JP | 09-163376 | 6/1997 |
| JP | 11-239351 | 8/1999 |
| JP | 2000299864 | 10/2000 |
| JP | 2006191220 | 7/2006 |
| WO | WO 1995/004433 | 2/1995 |
| WO | WO 1997/028507 | 8/1997 |
| WO | WO 1998/020457 | 5/1998 |
| WO | WO 1998/044743 | 10/1998 |
| WO | WO 1999/020040 | 4/1999 |
| WO | WO 1999/020045 | 4/1999 |
| WO | WO 2001/033864 | 5/2001 |
| WO | WO 2003/007119 | 1/2003 |
| WO | WO 2003/041041 | 5/2003 |
| WO | WO 2004/004310 | 1/2004 |
| WO | WO 2005/038603 | 4/2005 |
| WO | WO 2006/041879 | 4/2006 |

OTHER PUBLICATIONS

Ahmadianpour et al., "Novel techniques for reducing blocking artifacts in motion compensated frame," J. of Electronic Imaging, Jan. 1, 2006, 7 pages.

Aravind et al., "Packet Loss Resilience of MPEG-2 Scalable Video Coding Algorithms," *IEEE Transactions on Circuits and Systems for Video Technology*, 6(5): 426-435 (Oct. 1996).

Balle, et al., "Extended Texture Prediction for H.264 Intra Coding" Joint Video Team (JVT) of ISO/IEC MPEG & ITU-T VCEG (ISO/IEC JTC1/SC29/WG11 and ITU-T SG16, Jan. 14, 2007, 7 pages.

Bjontegaard, Ed., "H.26L Test Model Long Term No. 5 (TML-5) draft0," ITU-Telecommunications Standardization Sector, Eleventh Meeting: Portland Oregon, XP001086628, 31 pages (Aug. 22-25, 2000).

Bloomfield, "Copy Protection—déjà vu," *Broadcast Engineering*, 40(11): 14-15 (Oct. 1998).

Chen, et al., "Motion-Vector Optimization of Control Grid Interpolation and Overlapped Block Motion Compensation Using Iterated Dynamic Programming" IEEE Transactions on Image Processing vol. 9, No. 7, Jul. 2000, pp. 1145-1157, Jul. 2000.

Chen, et al., "Transform-Domain Intra Prediction for H.264" IEEE, May 23, 2005, pp. 1497-1500, XP010815802.

Chinese Office Action issued in 200980130414.3 dated Mar. 14, 2014, 22 pages [includes search report].

Choi et al., "Motion-Compensated Frame Interpolation Using Bilateral Motion Estimation and Adaptive Overlapped Block Motion Compensation," IEEE Transactions on Circuits and Systems for Video Technology, Apr. 30, 2007, 17:407-416.

Demos, "A comparison of hierarchical high definition imagery coding schemes," Compcon Spring '92. Thirty-Seventh IEEE Computer Society International Conference, Digest of Papers., pp. 68-75 (Feb. 1992).

Demos, "An Example Representation for Image Color and Dynamic Range Which is Scalable, Interoperable, and Extensible," 135th Technical Conference, Society of Motion Picture and Television Engineers, Los Angeles, CA, pp. 1-12 (Oct. 1993).

Demos, "Temporal and resolution layering in advanced television," *Proc. SPIE 2663*, Very High Resolution and Quality Imaging, 2663:52-68 (Feb. 16, 1996).

(56) References Cited

OTHER PUBLICATIONS

Demos, "The Use of Logarithmic and Density Units for Pixels," *SMPTE Journal* 100(10): 805-816 (Oct. 1990).
Flierl and Girod, "Multihypothesis Prediction for B frames," ITU Study Group 16, Video Coding Experts Group, Fourteenth Meeting, Santa Barbara, CA, 11 pages (Sep. 24-27, 2001).
Flierl et al., "A Locally Optimal Design Algorithm for Block-Based Multi-Hypothesis Motion-Compensated Prediction," Proceedings of the Data Compression Conference, 1998, Snowbird, UT, USA, Mar. 30-Apr. 1, 1998, Los Alamitos, CA, USA, IEEE Comput. Soc., US, pp. 239-248 (Mar. 30, 1998).
Girod, "Efficiency analysis of multihypothesis motion-compensated prediction for video coding," IEEE Transactions on Image Processing, Feb. 2000, 9:173-183.
Girod, "Why B-Pictures Work: A Theory of Multi-Hypothesis Motion-Compensated Prediction," Proceedings of 1998 International Conference on Image Processing, 1998, Chicago, IL, Oct. 4-7, 1998, Lost Alamitos, CA, USA, IEEE Comput. Soc., US, 2:213-217 (Oct. 1998).
Girod, Bernd, "Efficiency Analysis of Multihypothesis Motion-Compensated Prediction for Video Coding" IEEE Transactions on Image Processing, vol. 9, No. Feb. 2, 2000, pp. 173-183.
H.261, ITU-CCITT The International Telegraph and Telephone Consultative Committee of ITU "Line Transmission on Non-Telephone Signals. Video codec for audiovisual services at px64 kbits/s," 32 pages, (1990).
H.261, ITU-T Telecommunication Standardization Sector of ITU, "Line Transmission of non-telephone signals: Video Codec for Audiovisual Services at p x 64 kbits," 29 pages (Mar. 1993).
H.262, ITU-T Telecommunication Standardized Sector of ITU, "Transmission of Non-Telephone Signals. Information Technology—Generic coding of moving pictures and associated audio information: Video" 211 pages (Jul. 1995).
H.263 Appendix III, ITU-T Telecommunication Standardization Sector of ITU, "Series H: Audiovisual and Multimedia Systems, Infrastructure of audiovisual services—coding of moving video. Video coding for low bit rate communication, Appendix III: Examples for H.263 encoder/decoder implementations," 48 pages (Jun. 2001).
H.263, ITU-T Telecommunication Standardization Sector of ITU, "Series H: Audiovisual and Multimedia Systems, Infrastructure of audiovisual services—coding of moving video. Video coding for low bit rate communication," 226 pages (Jan. 2005).
H.263, ITU-T, Telecommunication Standardization Sector of ITU, "Series H: Audiovisual and Multimedia Systems. Infrastructure of audiovisual services—Coding of moving video. Video coding for low bit rate communication," 167 pages (Feb. 1998).
H.263, ITU-T, Telecommunication Standardization Sector of ITU, "Transmission of Non-Telephone Signals. Video coding for low bit rate communication," 52 pages (Mar. 1996).
Hannuksela, "Generalized B/MH-Picture Averaging," Joint Video Team (JVT) of ISO/IEC MPEG&ITU-T Video Coding Experts Group, Third Meeting, Fairfax, VA, 8 pages (May 6-10, 2002).
Heising et al., "Wavelet-based very low bit-rate video coding using image warping and overlapped block motion compensation," IEE Proc.-Vis. Image Signal Process, 148:93-101, (Oct. 20, 2000).
ISO/IEC 14496-2 International Standard, "Information technology—coding of audio-visual objects—Part 2: Visual," $2^{nd}$ Edition, 536 pages (Dec. 1, 2001).
ISO/IEC 14496-2 International Standard, "Information technology—coding of audio-visual objects—Part 2: visual. Amendment 2: Streaming video profile," 2nd Edition Feb. 1, 2002, 61 pages (Feb. 2002).
ISO/IEC JTC 1, "Coding of audio-visual objects—Part 2: Visual," ISO/IEC 14496-2 (MPEG-4 Part 2), Jan. 1999, 348 pages.
ISO/IEC JTC 1, "Coding of moving pictures and associated audio for digital storage media at up to about 1.5 Mbit/s—Part 2: Video," ISO/IEC 11172 (MPEG-1 ), Nov. 1993.
ITU-T and ISO.IEC JTC 1, "Generic coding of moving pictures and associated audio information—Part 2: Video," ITU-T Rec. H.262 and ISO/IEC 13818-2 (MPEG-2), Nov. 1994.
ITU-T, "Advanced Video Coding for Generic Audiovisual Services", series H: Audiovisual and Multimedia Systems; May 2003, pp. 1-282.
ITU-T, "Video codec for audiovisual services at px64 kbits/s," ITU-T Rec. H.261, v2: Mar. 1993, 29 pages.
ITU-T, "Video coding for low bit rate communication," ITU-T Rec. H.263, v2: Jan. 1998.
Jeon et al., "Coarse-to-fine frame interpolation for frame rate up-conversion using pyramid structure," IEEE Transactions on Consumer Electronics, Sep. 29, 2003, 49:499-508.
Joint Video Team (JVT) of ISO/IEC MPEG and ITU-T VCEG, Joint Committee Draft (CD), May 10, 2002, JVT-C167, p. i-ix, 1-132, 141 pages. (May 2002).
JVT Reference software Version H.264, Karsten Suhring, HHI, (Jan. 2005).
Kikuchi et al., "Improved Multiple Frame Motion Compensation Using Frame Interpolation," Video Standards and Drafts, $2^{nd}$ JVT Meeting, Geneva, CH, Jan. 29-Feb. 1, 2002, No. JVT-B075, pp. 1-8.
Kikuchi et al., "Multi-frame interpolative prediction with modified syntax," ITU-T Study Group 16 Video Coding Experts Group, Third Meeting, Fairfax, VA, 13 pages (Mar. 6-10, 2002).
Lillevold, "Improved Direct Mode for B Pictures in TML," ITU Study Group 16 Video Coding Experts Group, Eleventh Meeting, Portland, OR, 2 pages (Aug. 22-25, 2000).
Lim, "A migration path to a better digital television system," *SMPTE Journal* 103(1): 2-6 (Jan. 1, 1994).
Marpe et al., "High-performance wavelet-based video coding using variable block-size motion compensation and adaptive arithmetic coding," IEE, 2002, 6 pages.
Marpe et al., "Very low bit-rate video coding using wavelet-based techniques," IEEE Transactions on Circuits and Systems for Video Technology, Feb. 1999, 9:85-94.
Martucci et al., "A zerotree wavelet video coder," IEEE Transactions on Circuits and Systems for Video Technology, Feb. 1997, 7: 109-118.
Narroschke, Matthias, "Extending H.264/AVC by an Adaptive Coding of the Prediction Error" Picture Coding Symposium, Apr. 24, 2006 Beijing Sullivan, et al., "Methods of Reduced-Complexity Overlapped Block Motion Compensation" Proceedings of the International Conference on Image Processing (ICIP) Austin, Nov. 13-16, 1994, vol. 2, Nov. 13, 1994, pp. 957-961.
Nayan, et al., "Transform Domain Overlapped Block Disparity Compensation in Wavelet Coding of Stereo Image Pairs" Information Communications and Signal Processing, 2003 and Fourth Pacific Rim Conference on Multimedia. Proceedings of the 2003 Joint Conference of the Fourth International Conference on Singapore, Dec. 15-18, 2003, Piscataway, NJ, USA, IEEE, vol. 1, Dec. 15, 2003, pp. 208-212.
Orchard, et al., "Overlapped Block Motion Compensation: An Estimation-Theoretic Approach", IEEE Transactions on Image Processing, IEEE Service Center, Piscataway, NJ, US., vol. 3, No. 5, Sep. 1, 1994 pp. 693-699.
PCT International Preliminary Report Chapter II in International Appln. No. PCT/US2009/052650, dated Nov. 9, 2010, 14 pages.
PCT International Search Report and Written Opinion in International Appln. No. PCT/US2009/052650, dated Feb. 12, 2010, 19 pages.
Pinkerton, "Digital video stymied by content protection," *Dealscope: Consumer Electronics Marketplace*, Philadelphia, 4(1): 32 (Jan. 1999).
Poh et al., "Comparison of residual compression methods in motion compensated video," 2002 IEEE Workshop on Multimedia Signal Processing, Dec. 9-11, 2002, pp. 109-112.
Puri et al., "Temporal Resolution Scalable Video Coding, "Image Processing. 1994 International Conference, IEEE, pp. 947-951 (1994).
SMPTE 421M, "VC-1 Compressed Video Bitstream Format and Decoding Process", Apr. 2006.
Su et al., "Non-iterative rate-constrained motion estimation for OBMC," Proceedings of International Conference on Image Processing, Oct. 26-29, 1997, pp. 33-36.

(56) References Cited

OTHER PUBLICATIONS

Su, et al., "Motion Estimation Methods for Overlapped Block Motion Compensation" IEEE Transactions on Image Processing, vol. 9, No. Sep. 9, 2000, pp. 1509-1521.

Sullivan, et al., "Methods of Reduced-Complexity Overlapped Block Motion Compensation" Proceedings of the International Conference on Image Processing (ICIP) Austin, Nov. 13-16, 1994, vol. 2, Nov. 13, 1994, pp. 957-961.

Tan, et al., "Intra Prediction by Averaged Template Matching Predictors" Consumer Communications and Networking Conference, 2007, CCNC 2007, Jan. 1, 2007, pp. 405-409.

Tan, et al., "Intra Prediction by Template Matching" Image Processing, 2006 IEEE International Conference on, IEEE, PI, Oct. 1, 2006, pp. 1693-1696.

Tao, "Optimization of Hybrid Video Coders," Dissertation Presented to the Faculty of Princeton University, Nov. 1998, 24 pages.

Tao, et al., "A Parametric Solution for Optimal Overlapped Block Motion Compensation" IEEE Transactions on Image Processing, vol. 10, No. 3, Mar. 2001, pp. 341-350.

Tao, et al., "Joint Application of Overlapped Block Motion Compensation and Loop Filtering for Low Bit-Rate Video Coding" in Proceedings of the IEEE International Conference on Image Processing, vol. 3 pp. 626-629, Oct. 26-29, 1997.

Tudor, "MPEG-2 Video Compression Tutorial," IEE Colloquium on MPEG-2 (Digest Nr. 1995/012), London, UK, Jan. 24, 1995, pp. 2/1-2/8, (Jan. 24, 1995).

Vincent et al., "Spatial Prediction in Scalable Video Coding," International Broadcasting Convention, IEEE Conference Publication No. 413, RAI International Congress and Exhibition Centre, Amsterdam, The Netherlands, pp. 244-249 (Sep. 14-18, 1995).

Wiegand et al., " Draft ITU-T Recommendation and Final Draft International Standard of Joint Video Specification (ITU-T Rec. H.264 | ISO/IEC 14496-10 AVC)" 269 pages (May 27, 2003).

Woo, et al., "Overlapped Block Disparity Compensation with Adaptive Windows for Stereo Image Coding" IEEE Transactions on Circuits and Systems for Video Technology, IEEE Service Center, Piscataway, NJ, US., vol. 10, No. 2, Mar. 2000, pp. 194-200.

Woo, W. et al., "Modified Overlapped block Disparity Compensation for Stereo Image Coding," In Proc. SPIE EI-VCIP '99, Jan. 1999.

Wyszecki and Stiles, "*Color Science: concepts and methods, quantitative data and formulae,*" John Wiley & Sons, $2^{nd}$ Edition, pp. 485-489 (1982).

Zhang et al., "A low bit-rate video coding algorithm based on blocking regional wavelet transform with border processing," ICSP '98. 1998 Fourth International Conference on Signal Processing, Oct. 12-16, 1998, 823-826.

Zhang et al., "New windowing techniques for variable-size block motion compensation," IEE Proc.-Vis. Image Signal Process, Dec. 1998, 145:399-407.

Zhang et al., "Video Coding by Texture Analysis and Synthesis Using Graph Cut," Advances in Multimedia Information Processing, PCM 2006, 7th Pacific Rim Conference on Multimedia, Hangzhou, China, Nov. 2-4, 2006, 8 pages.

\* cited by examiner

PREDICTIVE MOTION VECTOR CODING

CROSS-REFERENCE TO RELATED APPLICATIONS

This application is a continuation of U.S. patent application Ser. No. 17/332,028, filed May 27, 2021, which is a continuation of U.S. patent application Ser. No. 16/790,337, filed Feb. 13, 2020, now U.S. Pat. No. 11,025,912, issued on Jun. 1, 2021, which is a continuation of U.S. application Ser. No. 16/517,382, filed Jul. 19, 2019, now U.S. Pat. No. 10,645,392, issued on May 5, 2020, which is a continuation of U.S. application Ser. No. 16/298,051, filed Mar. 11, 2019, now U.S. Pat. No. 10,574,994, issued on Feb. 25, 2020, which is a continuation of U.S. application Ser. No. 15/825,612, filed Nov. 29, 2017, now U.S. Pat. No. 10,321,134, issued on Jun. 11, 2019, which is a continuation of U.S. application Ser. No. 15/496,795, filed Apr. 25, 2017, now U.S. Pat. No. 9,843,807, issued on Dec. 12, 2017, which is a continuation of U.S. application Ser. No. 15/164,423, filed May 25, 2016, now U.S. Pat. No. 9,667,993, issued on May 30, 2017, which is a continuation of U.S. application Ser. No. 14/723,693, filed May 28, 2015, now U.S. Pat. No. 9,357,230, issued on May 31, 2016, which is a continuation of U.S. application Ser. No. 14/242,975, filed Apr. 2, 2014, now U.S. Pat. No. 9,060,168, issued on Jun. 16, 2015, which is a continuation of U.S. application Ser. No. 13/057,204 filed Feb. 2, 2011, now U.S. Pat. No. 9,445,121, issued on Sep. 13, 2016, which is a National Stage Entry of PCT/US2009/052650 filed on Aug. 4, 2009 which claims the benefit of priority of U.S. Provisional Patent Application No. 61/086,056, filed Aug. 4, 2008, all of which are hereby incorporated by reference in their entirety.

TECHNOLOGY

The present disclosure relates generally to video technology. More particularly, embodiments of the present invention relate to overlapped block disparity estimation and compensation.

BACKGROUND

As used herein, the term "image feature" may refer to one or more picture elements (e.g., one or more pixels) within a field. As used herein, the term "source field" may refer to a field from which information relating to an image feature may be determined or derived. As used herein, the term "intermediate field" may refer to a field, which may temporally follow or lead a source field in a video sequence, in which information relating to an image feature may be described with reference to the source field. As used herein, the term "disparity estimation" may refer to techniques for computing motion vectors or other parametric values with which motion, e.g., between two or more fields of a video sequence, may efficiently be predicted, modeled or described. An example of disparity estimation can be motion estimation. As used herein, the term "disparity estimate" may refer to a motion vector or another estimated parametric motion related value. As used herein, the term "disparity compensation" may refer to techniques with which a motion estimate or another parameter may be used to compute a spatial shift in the location of an image feature in a source field to describe the motion or some parameter of the image feature in one or more intermediate fields of a video sequence. Disparity compensation may involve a process of using a disparity estimate to derive the prediction of the current samples and/or regions of interest. A disparity model may include various spatial and/or temporal shift parameters. An example of disparity compensation can be motion compensation. The above terms may also be used in conjunction with various video coding concepts and prediction techniques (e.g., intra prediction and illumination compensation).

BRIEF DESCRIPTION OF THE DRAWINGS

Like reference numbers and designations in the various drawings can indicate like elements.

DESCRIPTION OF EXAMPLE EMBODIMENTS

Figure 1:
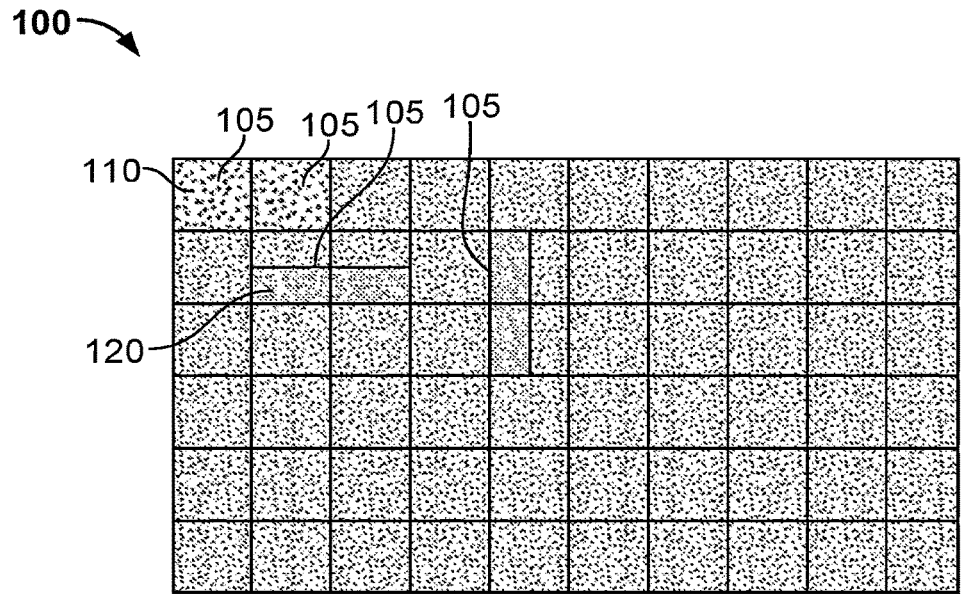
FIG. 1 depicts a diagram of an example of block motion compensation without OBDC.

Example embodiments relating to overlapped block disparity estimation and compensation are described herein. In the following description, for the purposes of explanation, numerous specific details are set forth in order to provide a thorough understanding of the present invention. It will be apparent, however, that embodiments of the present invention may be practiced without these specific details. In other instances, well-known structures and devices are depicted in block diagram form in order to avoid unnecessarily obscuring the present invention.

Overview

In some aspects, some embodiments include features for a method for motion compensation of images with overlapped block disparity compensation (OBDC). The method includes determining if OBDC is enabled in a video bit stream, and determining if OBDC is enabled for one or more macroblocks that neighbor a first macroblock within the video bit stream. The one or more neighboring macroblocks are transform coded. If OBDC is enabled in the video bit stream and for the one or more neighboring macroblocks, the method involves performing prediction for a region of the first macroblock that has an edge adjacent with the one or more neighboring macroblocks.

These and other embodiments can optionally include one or more of the following features. The step of determining if OBDC is enabled for the video bit stream or the one or more macroblocks can include any combination of the steps of: detecting a signaling instruction within the bit stream or the one or more macroblocks to enable OBDC; determining a semantic or relationship in the bit stream or the one or more macroblocks to enable OBDC; determining neighboring block information or differences in motion vectors to enable OBDC; or detecting an association of the one or more macroblocks with a reference index that points to a reference picture that is associated with OBDC coding. The method may involve applying a coding order. The step of applying the coding order can include utilizing a raster scan coding order, a horizontal coding order, a vertical coding order, an arbitrary coding order, or a zig-zag coding order. The method can also involve the step of applying another type of prediction to the OBDC prediction.

These and other embodiments can also optionally include one or more of the following features. Other types of prediction can include inter prediction, intra prediction, cross-layer prediction, cross-view prediction, prediction using multi-hypothesis, and/or prediction with dependencies for the one or more neighboring macroblocks. Other types of prediction can include prediction with a type of overlapping, prediction with a type of propagation, prediction that is independent of information of future macroblocks, or prediction with multiple macroblock sizes or macroblock boundaries. The overlapping can involve internal overlapping of the region of the first macroblock or external overlapping of the region of the first macroblock. The internal overlapping of the region can involve overlapping the region using information from one or more pixels of the first macroblock, and the external overlapping of the region can involve overlapping the region using information from pixels of one or more regions of the one or more neighboring macroblocks. Some of the predictions may include prediction with propagation in a pre-determined direction. The macroblocks can form a square pattern, a diamond pattern, or a circular pattern, and the prediction can extend in one or two directions for the pattern. The macroblocks can also form an orthogonal pattern, and polygons with N number of edges, and the prediction can extend in at least three dimensions (e.g., three-dimensional prediction). The prediction can include mesh-based prediction, wherein the mesh-based prediction can be represented by triangular shapes. The method can include generating residual information from the prediction, in which the residual information can include information for the first macroblock and the one or more neighboring macroblocks, and the residual information can include motion/disparity information. The method may optionally involve transform coding the residual information, quantizing the transform coded residual information, and entropy encoding the quantized information.

These and other embodiments can also optionally include one or more of the following features. The method can involve decoding the residual, in which the step of decoding can be independent of information from future macroblocks in an image of the video bit stream. Any of the predictions can include one or more operations from filtering, interpolation, scaling, or affine projection. The method can involve sharing and/or copying one or more disparity compensation parameters or modes amongst one or more views or layers. The method can include using information for the prediction of the region of the first macroblock to perform prediction for one or more regions of another neighboring macroblock, in which the other neighboring macroblock is non-transform coded. The step of performing the prediction can include applying OBDC to a subset of directions that are available for prediction for the first macroblock. Transformed residuals may be present for the one or more neighboring macroblocks for which a presence of a transformed residual is signaled in the video bit stream.

In some aspects, some embodiments include features for a method for motion compensation of images with overlapped block disparity compensation that includes the steps of determining if OBDC is enabled in a video bit stream, and determining if OBDC is enabled for a first macroblock within the video bit stream. The first macroblock is transform coded, and the first macroblock is adjacent to one or more neighboring macroblocks. If OBDC is enabled in the video bit stream and for the first macroblock, the method includes performing prediction for a region of the one or more neighboring macroblocks using information from the first macroblock, in which the region includes a non-transform coded region.

These and other embodiments can also optionally include one or more of the following features. The information associated with this method can include motion vector information, texture information, and/or information associated with a pixel. The step of determining if OBDC is enabled for the video bit stream or the first macroblock includes one or more of the following steps: detecting a signaling instruction within the bit stream or the first macroblock to enable OBDC; determining a semantic or relationship in the bit stream or the first macroblock to enable OBDC; determining neighboring block information or differences in motion vectors to enable OBDC; or detecting an association of the first macroblock with a reference index that points to a reference picture that is associated with OBDC coding.

In some aspects, some embodiments include features for a method for disparity compensation of images with overlapped block disparity compensation, the method includes the steps of determining if OBDC is enabled in a bit stream of video information, determining a first region of a first macroblock within the bit stream, and determining whether one or more residual regions in one or two macroblocks that are transform coded and adjacent to the first macroblock are enabled for overlapping prediction. If the bit stream is enabled for OBDC and the one or more residual regions are enabled for overlapping prediction, the method involves predicting pixels in the first region of the first macroblock using motion vectors from only the one or more residual regions in the one or two adjacent macroblocks, and weighting the pixels in the first region as a function of a distance of the pixels from an area of the one or two adjacent macroblocks.

These and other embodiments can also optionally include one or more of the following features. The prediction for the pixels can be a causal prediction. The weighting can include a weighted average that is based on the distance. The OBDC can involve a computation of a residual of the first macroblock that is independent of information from future macroblocks. The "future" macroblocks may refer to macroblocks to be coded or processed at a future time (e.g., future-coded macroblocks). Alternatively, the overlapped motion compensation can be computed independently of information from a future or adjacent macroblock. The first region can be neighboring a first boundary of the first macroblock. The prediction can involve intra prediction. The intra coding or intra prediction can include one or more of vertical prediction, horizontal prediction, diagonal prediction, and/or inter prediction, which may include single, bi-predictive inter prediction or multi-hypothesis inter prediction, or a combination of intra and inter prediction. The method can involve signaling the one or more adjacent macroblocks with one or more of flags or semantics. The method may also involve predicting pixels in one or more other regions, and combining the prediction of the first region with the prediction for the one or more regions. The prediction can include a coding mode for the macroblocks, in which the coding mode includes an arbitrary coding mode, a spiral coding mode, a random coding mode, a horizontal coding mode, a vertical coding mode, or a diagonal coding mode. One or more other types of predictions can be combined for the first region. The macroblock can have a block partitioning that is different from a block partitioning of one of the adjacent macroblocks.

These and other embodiments can also optionally include one or more of the following features. The method can include predicting information for other regions within a picture, in which the other regions include overlapping macroblock regions and non-overlapping macroblocks regions. One or more of the macroblocks can include transformed residuals for which a presence of at least one of the transformed residuals is signaled in the video bit stream. The prediction can be combined with another type of prediction from one of the adjacent macroblocks, in which the other type of prediction can involve prediction using multi-hypotheses, or prediction with multiple block sizes or macroblock partition types. The method can also involve applying weighting to the other type of prediction.

In some aspects, some embodiments include features for a computer program product, encoded on a computer-readable medium, which includes instructions to cause data processing apparatus to perform operations for overlapped block disparity estimation and compensation for images. The operations include, for a number of macroblocks, performing OBDC prediction for at least a first subset of macroblocks by overlapping less than all block boundaries for the macroblocks in at least the first subset such that the OBDC prediction for at least the first subset is causal.

These and other embodiments can optionally include one or more of the following features. The operations can include performing OBDC prediction for a second subset of macroblocks that involves overlapping by overlapping all block boundaries for the macroblocks in the second subset, and combining the OBDC prediction for at least the first subset with the OBDC prediction for the second subset. The operations can involve performing a type of motion prediction for a second subset of macroblocks that differs from the OBDC prediction of the macroblocks in at least the first subset of macroblocks, and combining the OBDC prediction for at least the first subset with the type of prediction for the second subset. The operations for the combining can involve applying a weighting parameter to the OBDC prediction for at least the first subset or the type of prediction for the second subset. Other operations can include applying weighting to at least the first subset of macroblocks using the OBDC prediction; and applying a prediction mode to the OBDC prediction. The prediction mode can include an internal prediction, an external prediction, or a combination of internal and external OBDC prediction. The OBDC prediction can include a coding mode for at least the first subset of macroblocks, in which the coding mode can include an arbitrary coding mode, a spiral coding mode a horizontal coding mode, a vertical coding mode, or a diagonal coding mode. Instructions can also be associated with OBDC prediction that involves computing a residual of the first macroblock that is independent of information from future macroblocks.

In some aspects, some embodiments include features for a system to perform motion estimation of images. The system includes a display device to display image data, a computer readable medium to store the image data and instructions for image data processing, and a data processing device to process the instructions and image data, in which the instructions causes the device to perform overlapped block disparity estimation for images. The operations involve, for a number of macroblocks, performing OBDC prediction for at least a first subset of macroblocks by overlapping less than all block boundaries for the macroblocks in at least the first subset such that the OBDC prediction for at least the first subset is causal.

These and other embodiments can optionally include one or more of the following features. The instructions can include performing a type of motion prediction for a second subset of macroblocks that differs from the OBDC prediction of the macroblocks of at least the first subset of macroblocks, and combining the OBDC prediction for at least the first subset with the type of prediction for the second subset. The instructions for the combining can involve taking a weighted average of the OBDC prediction for at least the first subset and the type of prediction for the second subset of macroblocks. The macroblocks can include macroblocks having various shapes or block size partitions. The OBDC prediction can be signaled explicitly or via semantics to indicate whether OBDC prediction is to be used for a macroblock in at least the first subset of macroblocks. One or more of the macroblocks can include transformed residuals for which a presence of at least one of the transformed residuals is signaled in the video bit stream.

In some aspects, some embodiments include features for a system for disparity estimation and disparity compensation for video. The system includes a video encoder that has one or more video encoder components for encoding that causally executes overlapped block disparity estimation and compensation to a subset of macroblocks in an image of a video bit stream. The one or more video encoder components include a disparity estimation component to determine one or more prediction modes or prediction parameters, and a disparity compensation component to utilize disparity estimation component information to generate prediction information utilizing causally-executed OBDC for the subset of macroblocks. The system also includes a video decoder having one or more components for decoding, in which the one or more video decoder components can execute entropy decoding, execute disparity compensation, and/or generate residual information utilizing the causally-executed OBDC.

These and other embodiments can optionally include one or more of the following features. The one or more video decoder components can be arranged to execute the entropy decoding, execute the disparity compensation, and/or generate the residual information in series or in parallel.

Any of the methods or techniques described herein can also be implemented in a system, an apparatus or device, a machine, a computer program product, in software, in hardware, or in any combination thereof. For example, the computer program product can be tangibly encoded on a computer-readable medium, and can include instructions to cause a data processing apparatus (e.g., a data processor) to perform one or more operations for any of the methods described herein.

Overlapped Block Disparity Compensation (OBDC) Techniques

The disclosed techniques can use overlapped block disparity compensation (OBDC) and a variation of OBDC, primarily overlapped block motion compensation (OBMC), for prediction. OBDC can be used with one or more blocks (e.g., macroblocks) or regions. OBDC in a block (or region) can re-use the various prediction information, e.g., motion vectors, reference indices, illumination change parameters, intra prediction methods among others, from other blocks (or the block's overlaps) such that the overlapping blocks (or regions) can be predicted using multiple hypotheses associated with each overlapping block (or region). The disclosed OBDC techniques can be causally applied, and can be employed with arbitrary and flexible coding orders, such as vertical, horizontal, and/or spiral coding order. The disclosed OBDC techniques can be signaled (e.g., invoked) explicitly or by semantics to indicate whether OBDC is to be used for a block or region. OBDC can also be signaled based on the information of neighboring blocks and their relationship with the current block and its signaled disparity parameters, and/or based on information for a range of minimum or maximum disparity or motion vectors. The information for minimum and maximum vectors, or the differences between motion vectors, can be based on a pattern or can be adaptively changed. For example, if differences between motion vectors between blocks are small, then OBDC can be automatically inferred for those blocks. In some embodiments, there can be a dynamic OBDC weight generation, in which weights are applied to each OBDC hypothesis for the generation of the final prediction, based on disparity vector (e.g., motion and/or illumination compensation parameters) relationships.

In some embodiments, if OBDC is allowed or signaled in a video bit stream, then prediction for a block in the bit stream can be performed that utilizes OBDC for one or more regions of the block's edges that neighbor previously-encoded blocks, if OBDC is also allowed or signaled for those neighboring blocks. Further, if OBDC is allowed for the current block in the bit stream, information (e.g., motion vector and or illumination compensation information) from the block can be used to provide an initial prediction of uncoded regions.

Also, there can be weighting (e.g., illumination compensation, scaling parameters) applied to motion vectors to indicate how much OBDC will be used. The weighting can be variable based on the semantics of the motion vectors. For example, similar motion vectors can have similar weights and dissimilar motion vectors can have dissimilar weights.

In some system embodiments, disparity estimation (e.g., motion estimation, intra prediction search, illumination parameter search, etc), disparity compensation, and mode decision can be employed in a system in the context of OBDC. In other embodiments, OBDC can be used for parallelization of the encoding and decoding processes. In some embodiments, less blockiness may exist between block (e.g., macroblock) boundaries, and transform and coding processes can be independent of regions that have yet to be coded. In other embodiments, various types of prediction and OBDC techniques can be employed for providing a level of coding quality with low system resources. For example, the OBDC techniques can be employed with internal and/or external OBDC prediction, OBDC with various block (e.g., macroblock) sizing and rasterizing directions, and OBDC with various modes. The OBDC employed may or may not be block-based OBDC embodiments. In some embodiments, the OBDC techniques may involve a combination of OBDC and non-OBDC prediction.

Video compression systems and standards (e.g., ISO MPEG-1, MPEG-2, MPEG-4, MPEG-4 AVC/ITU-T H.264, H.261, H.263, and VC-1) may rely on intra and inter coding in order to achieve compression. In intra coding, spatial prediction methods can be used. Scalable systems (e.g., cross-layer prediction) and multi-view (e.g., 3D) systems (e.g., cross-view prediction) may be similar to inter view prediction systems. OBDC can be used with any of these types of systems, and OBDC partitions from other layers or views can be predicted or reused with any of these systems in various embodiments.

In inter coding, compression can be achieved by exploiting the temporal correlation that may exist between pictures. More specifically, previously coded pictures can be used as prediction references for future pictures and motion and/or illumination change estimation and compensation can be employed to determine and compensate for similarities between these pictures. Any residual information can then be encoded given a certain bit rate constraint using transform and quantization based techniques (e.g., by making use of the discrete cosine transform (DCT), variants thereof such as the modified DCT (mDCT), other Fourier-like transforms, or wavelets). In this disclosure and for the sake of generality, any type of change that may occur from one or more pictures to another (e.g., local or global translational, affine or any other type of motion, illumination or focus changes, etc.) can be referred to as "disparity" In some systems (e.g., H.264 or VC-1), the decoding process can also consider a post-processing/de-blocking operation that attempts to alleviate the discontinuities that might have been introduced between adjacent partitions due to motion estimation inaccuracies around boundaries and/or due to the quantization process.

For some applications, scalable (e.g., the Scalable Video Coding (SVC) extension to AVC), or multi-view video coding solutions (e.g., Multi-view video coding extension of AVC) also may be required. Such systems may use similar prediction methods and inter coding methods. These systems may add as references information from previously decoded images that correspond to either previous lower quality or resolution references (e.g., cross-layer prediction), or different views (e.g., cross-view prediction). These references may have been optionally preprocessed (e.g., filtered, upscaled, or affine transform projected) prior to usage as predictions. In some of these environments, disparity information from a previously coded view could be reutilized or used to predict the disparity information (e.g., modes, reference indices, motion information, etc.) for the currently encoded image.

There are several techniques that may address motion estimation in video. Some motion estimation techniques involve "matching" methods, such as block matching techniques. For these matching methods, the constraints on a smoothness of the motion field can be imposed by the enforcement of a parametric model for the motion over some region, which can be a block or rectangular region in block matching techniques or, more generally, arbitrarily shaped regions or segments of the images.

Block Motion Compensation (BMC) refers to a technique that is used for inter coding and exploits the temporal correlation that may exist between adjacent frames. The technique considers motion parameters, including illumination change parameters, to predict a block or region from previously encoded information. In some encoding systems, the quality of this block can be further enhanced by encoding the residual (error) of the prediction process utilizing transform coding techniques, such as wavelets or the discrete cosine transform, followed by quantization and entropy coding. BMC (and OBDC described below) can be used, for example, for filtering operations or other operations where encoding of the residual is not performed. In some standards and codecs, blocks can be of different sizes and may not be usually overlapped.

For example, FIG. 1 depicts a diagram of an example of block motion compensation without OBDC. In particular, FIG. 1 depicts a diagram 100 for block motion compensation that uses non-overlapping prediction with different block sizes 105. Some of the blocks 110 in the diagram 100 are a first size, while other blocks 120 are a second, different block size. In the example depicted in FIG. 1, the blocks 110 and 120 do not overlap.

Blocks may also be aligned with the transform grid, even though in many cases the transform may be of a smaller size than the prediction block. In other techniques, however, referred to as overlapped block motion or disparity compensation techniques (OBMC or OBDC), overlapping blocks can be used. In OBDC, an image can be separated in several overlapping blocks. Each block can be associated with disparity parameters, such as motion vectors, which are used for the prediction of the respective block. Given that a block may overlap with multiple other blocks, a pixel in such an overlapping region can have multiple predictors that can be combined in a multi-hypothesis manner to generate a final prediction.

Figure 2:
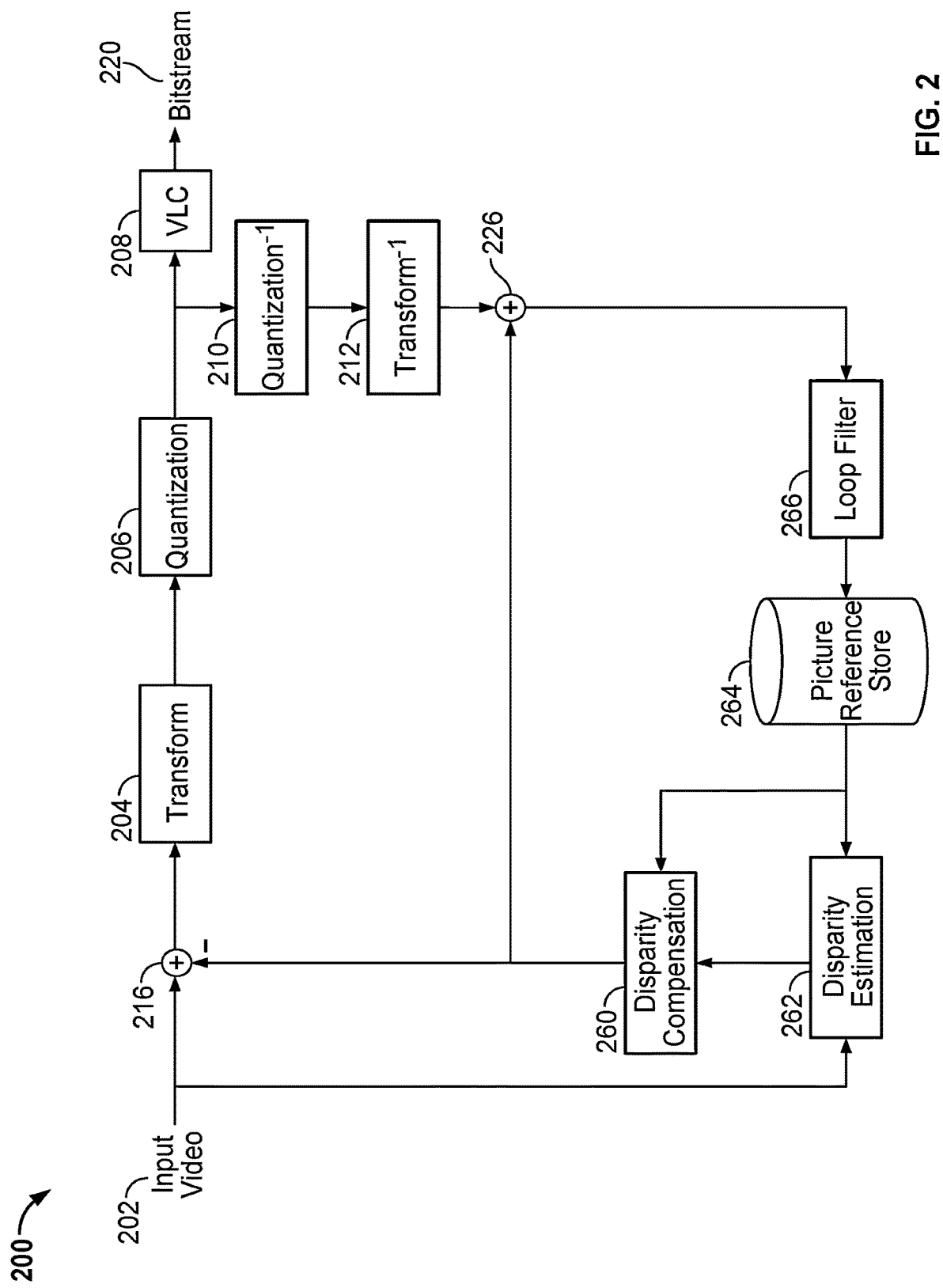
FIG. 2 depicts a diagram of an example video encoder.

FIG. 2 depicts a diagram of an example video encoder 200 in which OBDC can be used. The encoder 200 may be an encoder for advanced video coding standard (AVC), otherwise referred to as H.264. In encoder 200, the input video 202 is sent to an adder 216 that sums the input video frame 202 with an output of a disparity compensation (e.g., motion/illumination change compensation and/or intra-prediction) component 260. The output from the adder 216 is coupled to a transform component 204, followed by a quantization component 206. The output of the quantization component 206 is coupled to a variable length coding (VLC) component 208 and an inverse quantization component 210. The bit stream 220 results from the VLC component 208 and information about the encoding process, such as the number of bits required to encode a block, region, or image, and the distortion introduced by such decision, are sent to the loop filter 266 and other components.

The disparity compensation component 260 can generate the prediction signal given information/decisions from the disparity estimation component 262. Disparity compensation, for example, can be in the form of intra prediction, e.g., making use of samples for prediction from previously encoded regions within the current picture, motion compensated prediction including considerations for illumination changes, and can also consider OBDC techniques for motion compensation. The disparity estimation component 262 can perform tasks that may include: (a) determine the appropriate prediction parameters such as inter prediction modes/partitions, motion vectors, illumination change parameters, and/or intra prediction modes, (b) selectively enable and disable motion-compensation block-sizes; (c) use certain pictures as motion-compensation references; (d) adjust the motion estimation search range and the number of iterations in joint bi-predictive motion estimation, (e) limit the number of coding modes to be tested given some predefined conditions or information about the image, among others. Disparity estimation could be done given knowledge that the video will be encoded using OBDC methods, e.g., the estimation method can consider search techniques that try to optimize performance given the prediction technique that is to be used. The loop filter component 266 can perform tasks that may include: (a) adjust the parameters of the in-loop deblocking filter; (b) switch-off the deblocking filter, among others.

The inverse transform component 212 receives an input from the inverse quantization component 210 and sends an output to an adder 226. The adder 226 receives the signal from the inverse transform component 212 and the disparity compensation component 260, and sends a summed signal to a loop filter 266. A picture reference store 264 receives an input from the loop filter 266, and sends an output to the disparity compensation component 260 and the disparity estimation component 262. The disparity estimation component 262 also receives an input from a rate control component (not shown). The loop filter 266 also receives an input from the rate control component. The input video 202 is also sent to an input of the disparity compensation component 260 and the disparity estimation component 262.

Figure 3:
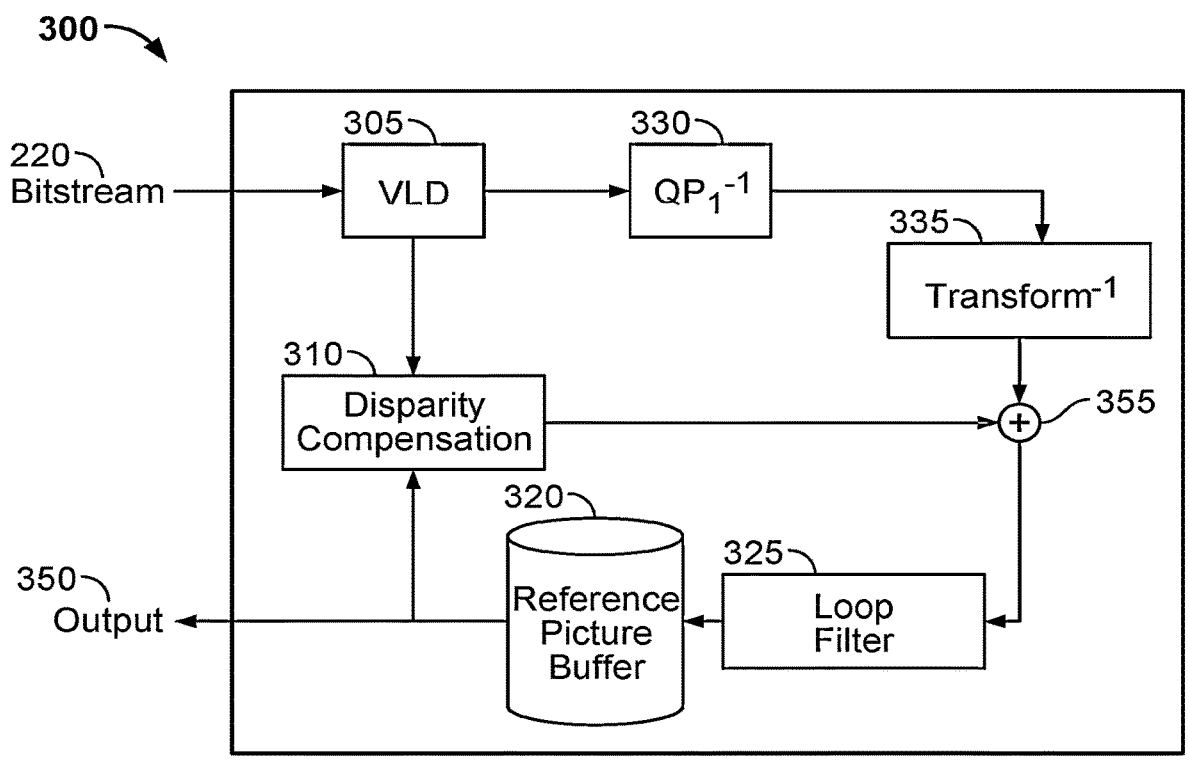
FIG. 3 depicts a diagram of an example video decoder.

FIG. 3 depicts a diagram of an example video decoder 300. The decoder 300 may be a decoder that includes functionality similar to the H.264/MPEG-4 AVC standard. The decoder 300 receives the bit stream 220, and decodes the bit stream using an entropy (variable length) decoder 305, one or multiple inverse quantizers 330, one or multiple inverse transforms 335, and a disparity compensator 310. The entropy decoder 305 may extract both header information, including disparity information such as modes, motion vectors, illumination change parameters, intra prediction modes, among others, and quantized and transformed residual data. Disparity compensation, and more specifically prediction of the signal, is performed given the header information in 310, while the residual data are first dequantized using the inverse quantizer 330 and then inverse transformed using the inverse transform 335. An adder 355 adds the output of the inverse transform 355 and the disparity compensator 310, and sends the summed result to a loop filter 325. The output of the loop filter 325 is coupled to a reference picture buffer 320, which can be used for storing pictures for reference and delivering an output 350. Prediction in the disparity compensation block 310 could utilize OBDC techniques.

Figure 4C:
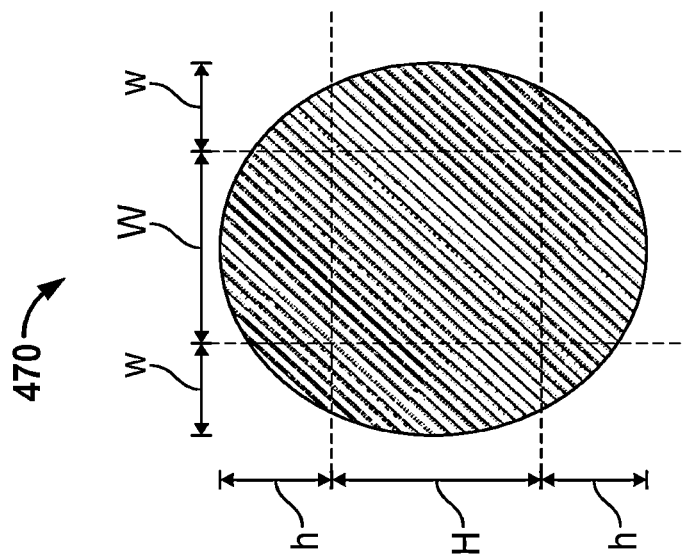
FIG. 4C is a diagram of an example circular-shaped OBDC or overlapped partition motion compensation pattern.
Figure 4B:
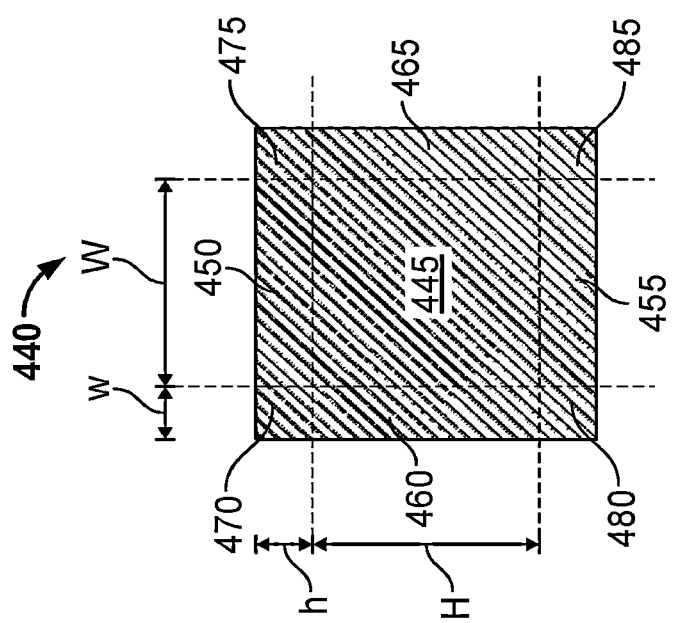
FIG. 4B is a diagram of an example orthogonal-shaped OBDC or overlapped partition motion compensation pattern.
Figure 4A:
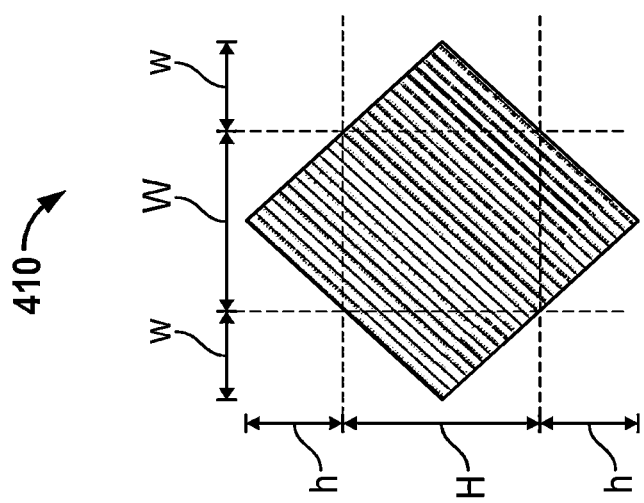
FIG. 4A is a diagram of an example diamond-shaped OBDC or overlapped partition motion compensation pattern.

FIGS. 4A-4C depict some example patterns that can be used for OBDC or overlapped partition disparity compensation pattern. FIG. 4A is a diagram 410 of an example diamond-shaped OBDC or overlapped partition disparity compensation pattern. FIG. 4B is a diagram 440 of an example orthogonal-shaped (e.g., square-shaped) OBDC or overlapped partition disparity compensation pattern. FIG. 4C is a diagram 470 of an example circular-shaped OBDC or overlapped partition disparity compensation pattern. As depicted in FIGS. 4A-C, OBDC techniques can allow prediction blocks or regions to overlap, which results in several pixels being predicted simultaneously by multiple disparity parameters, e.g., motion vectors. OBDC can improve the prediction of block boundaries.

In some embodiments, these multiple predictions can be, for example, weighted averages based on the distance of a pixel, for which hypotheses weights are to be derived, which are compared to a center of one or more neighboring blocks that corresponds to each prediction. In other embodiments, the distance may be between two motion vectors (e.g., |mv1-mv2|). This process can predict block boundaries, reduce residual effects, achieve efficient coding, and reduce blockiness that may occur at prediction boundaries.

FIG. 4B depicts the least complex of the patterns. For example, a center region 445 of the diagram 440 of the square pattern of FIG. 4B is defined by W×H. The block size of the diagram 440 is (2h+H)×(2w+W). The overlapped regions can be regions W×h 450, 455, H×w 460, 465, and w×h 470, 475, 480, 485. These regions 450, 455, 460, 465, 470, 475, 480, 485 can be overlapped with other patterns.

Figure 5:
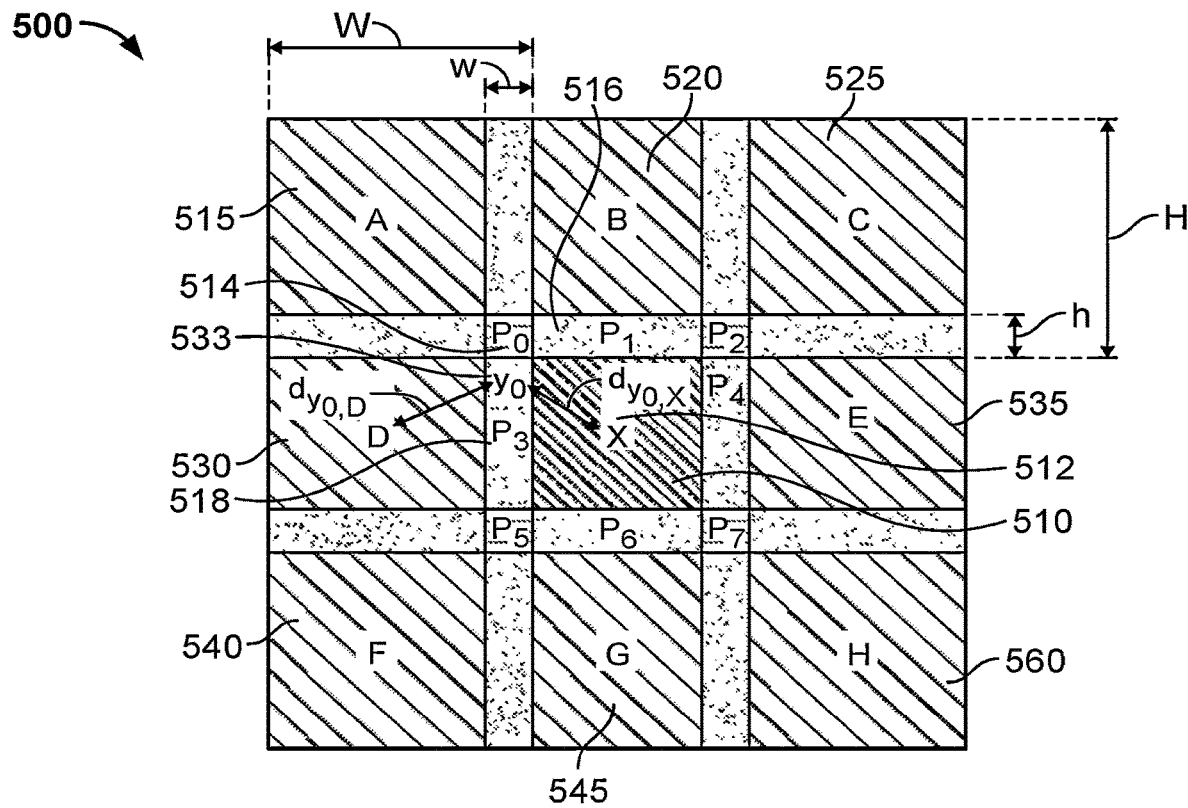
FIG. 5 depicts example predicted block regions in which different regions are predicted using multi-hypothesis based motion compensation.

FIG. 5 depicts example predicted block regions in a diagram 500 in which different regions are predicted using multi-hypothesis based motion compensation (e.g., by employing overlapped block motion compensation, including the usage of bi-predictive motion compensation). In some embodiments, for example, overlapped block disparity/motion compensation can be seen as an instance of multi-hypothesis motion compensation, in which a pixel may be predicted using multiple hypotheses. Prediction blocks or regions in this coding structure are allowed to overlap, which results in several pixels being predicted simultaneously by multiple motion vectors. For example, assuming single list prediction, region 514 can utilize four predictions, while regions 516 or 518 can utilize two predictions given the vectors of overlapping blocks. These multiple predictions may be, for example, weighted averages based on the distance of a pixel, for which hypotheses weights are to be derived, which are compared to a center of one or more neighboring blocks that corresponds to each prediction, or for the distance between two motion vectors. An extension to bi-predictive motion compensation (e.g., B coded pictures or B slices) and multi-hypothesis motion compensation using multiple references can also be considered with the above methods.

In FIG. 5, for instance, block X 510 is depicted, and its neighboring blocks are blocks A-H 515-560. Each block is of size W×H and the overlapping happens on each direction with a width of w and a height of h. The pixels in region $P_0$ 514 of the diagram 500 are predicted using the motion vectors from blocks A 515, B 520, D 530, and X 510, while pixels in region $P_1$ 516 are predicted using the motion vectors from blocks B 520 and X 510 only. Furthermore, the weighting considered for each pixel within each region can relate to the distance of that pixel from the center of each OBDC block that is used for its prediction. For example, in the case of pixel $y_0$ 533 in FIG. 5, which belongs to region $P_3$ 518, its value can be predicted as:

$$\text{value}_{y_0} = w(\text{dist}_{y_0,D}) \times \text{MCPvalue}(\overrightarrow{MV_D}) + w(\text{dist}_{y_0,X}) \times \text{MCPvalue}(\overrightarrow{MV_X}) \quad \text{Eq. (1)}$$

where $\text{dist}_{y_0,D}$ and $\text{dist}_{y_0,X}$ are the distances of $y_0$ 533 from the centers of block D 530 and X 510, $\overrightarrow{MV_D}$ and $\overrightarrow{MV_X}$ are the motion and weighting parameter vectors for blocks D 530 and X 510, and MCPValue( ) and w( ) are the values of the motion compensation process and the weighting for the prediction, respectively. This expression can be generalized to:

$$\text{value}_{y_0} = \sum_k w_k(\text{dist}_{y_0,block_k}) \times MCPvalue(\overrightarrow{M_{block_k}}), \quad \text{Eq. (2)}$$

where k corresponds to the index of all blocks in the neighborhood of block X 510, including X 510. Generally, regions $P_0$-$P_7$ in FIG. 5 can be predicted using multi-hypothesis based motion compensation with motion vectors signaled for block X 510 and all its neighbors.

In some embodiments, weighting (e.g., scaling parameters, illumination compensation) may be applied to the prediction samples of each hypothesis given the values of the motion vectors (or other parametric motion estimate values) of each hypothesis to indicate how much and if OBDC should be used. The weighting can be adapted based on semantics associated with the motion vectors, or the disparity compensation parameters, e.g., apart from motion vectors, illumination parameters, reference indices, intra prediction modes, etc. For example, similar motion vectors may have similar weights and dissimilar motion vectors may have dissimilar weights. The availability of a predictor, especially in the case that the neighbor is of a different type (e.g., a single or multiple list that is inter predicted or an intra predicted block) can also affect the weighting parameters.

Square, orthogonal, or similarly-configured regions are used in the MPEG-4 video coding standard (and others), in part perhaps for their simplicity. In some OBDC embodiments, for example, some types of OBDC methods can require, for best performance, that all overlapping predictions be jointly optimized at the encoder. Some OBDC embodiments may require information for blocks with predictions in all directions. For the encoder to first synthesize the entire prediction or all dependent prediction regions prior to creating and coding, (e.g. use of transform, quantization and entropy coding, the residual signals) the information from the neighboring blocks may need to be already available before creating the prediction in some embodiments. The consideration of rate distortion optimized techniques for motion estimation and mode decision may require multiple iterations or computations considering the dependencies of adjoining blocks. Hence, the encoder may have to be configured to handle these type of computations.

Similarly, at the decoder, some techniques may be non-causal and may require that predictions from all overlapping partitions are available before reconstructing a certain sample. This non-causality may be considered in the performance for some architectures due to data dependencies, memory requirements and related operations. More specifically, the prediction signal may first be generated, stored in a temporary memory, and wait until the residual signal is available for final reconstruction. Alternatively, a decoder may wait for all information to be available before performing any operations.

Figure 6:
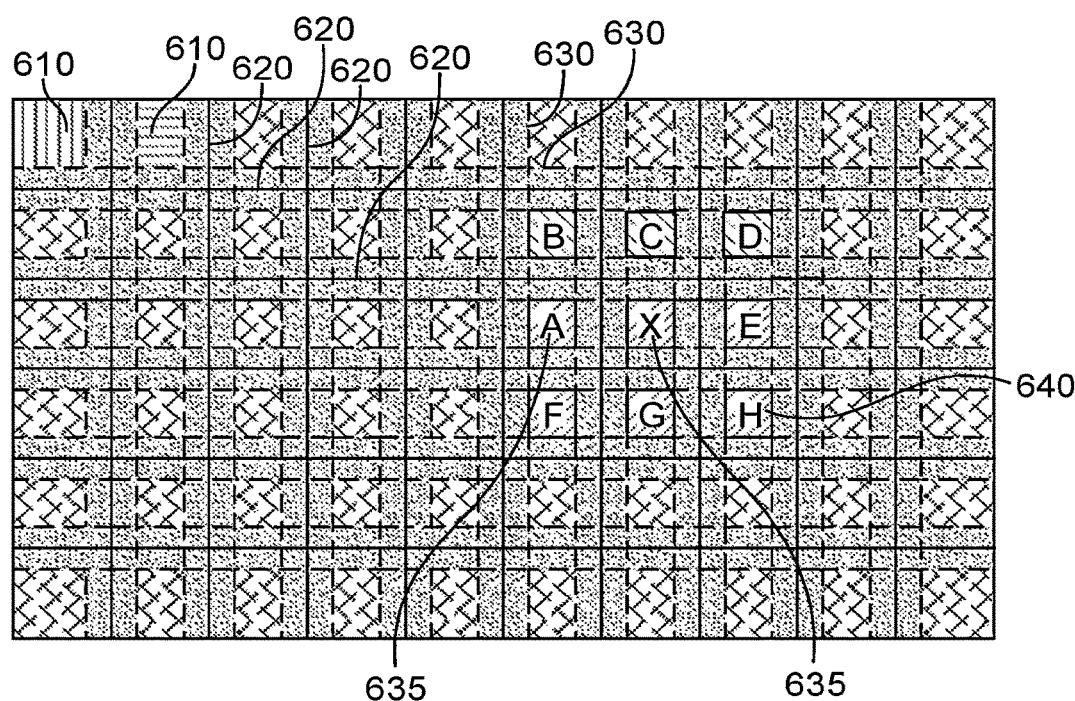
FIG. 6 depicts a diagram of an example OBDC embodiment.

FIG. 6 depicts a diagram 600 of an example OBDC embodiment that uses overlapping areas in all directions. The blocks can be generally referred to as transform blocks 610. The blocks 610 are separated by a transform grid 620, and each of the blocks can have an overlapping area 630 with adjacent blocks. In the embodiment of FIG. 6, the residual for a certain block (e.g., X 645) is computed based on information from all blocks (e.g., A-H 635-640) that provide prediction information for this region. In some embodiments, described below, the computation of the residual can be constrained in one or two directions. In other example embodiments, prediction can be extended in three or more dimensions (e.g., three-dimensional prediction).

Figure 7C:
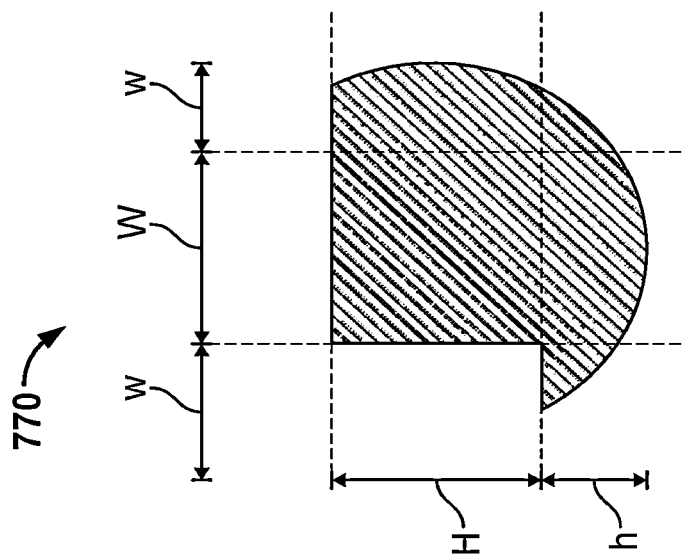
FIGS. 7A-7C depict diagrams of patterns for examples of overlapped partition motion compensation.
Figure 7B:
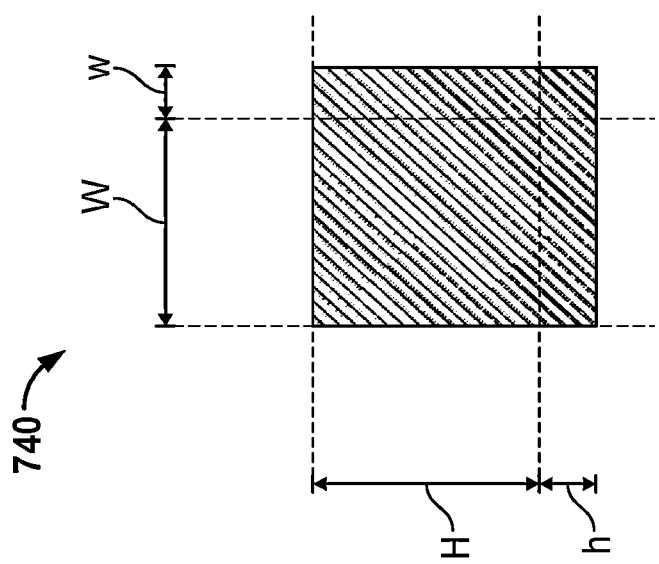
Figure 7A:
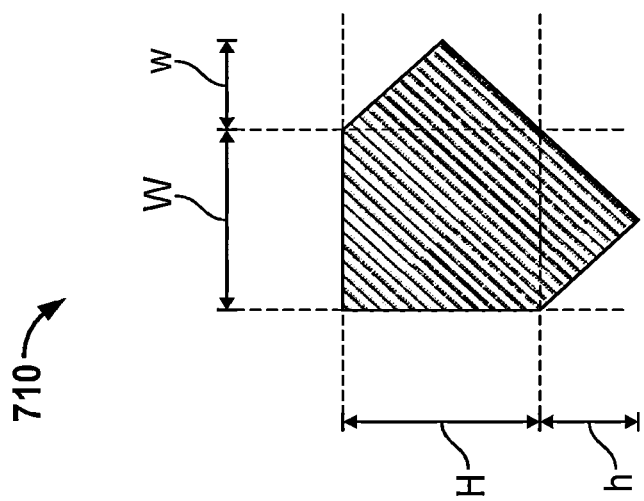

For example, in some embodiments, assuming a raster scanning order (e.g., left-right & top-bottom), regions on the left and/or above are considered for performing OBDC (e.g., FIG. 7A-FIG. 7C). This process can move the residual generation process from the center of the motion compensated block to its top-left corner. This causality may allow the residual to be immediately computed without requiring any knowledge for any future blocks, which may promote optimization. For example, Rate Distortion Optimization techniques, such as Lagrangian optimization, may be used. Moreover, entropy decoding, motion compensation, and generation of the residual samples may execute in parallel, which may use memory or generate samples efficiently.

FIGS. 7A-7C depict diagrams of patterns for examples of overlapped partition motion compensation. The diagrams 710, 740, 770 of FIG. 7A-FIG. 7C respectively depict example patterns for OBDC or overlapped partition disparity compensation using a causal overlapping area (and assuming a raster scanning order). FIG. 7A depicts a diagram 710 for an example diamond pattern, in which the process extends to the right and bottom of the pattern. FIG. 7B depicts a diagram 740 for an example block/square pattern, in which the process extends to the right and bottom of the pattern. FIG. 7C depicts a diagram 770 for an example circular pattern, in which the process extends to the right and bottom of the pattern. In each of the diagrams 710, 740, 770, regions on the left and above are considered for performing OBDC.

Figure 8A:
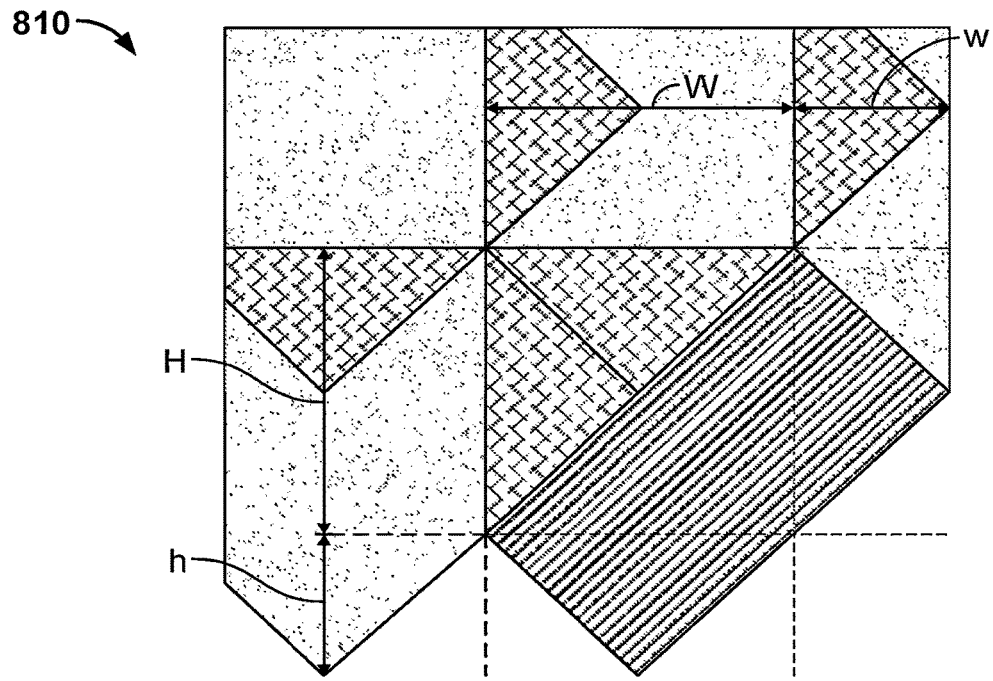
FIGS. 8A-8B depict diagrams of patterns for examples of overlapped partition motion compensation.
Figure 8B:
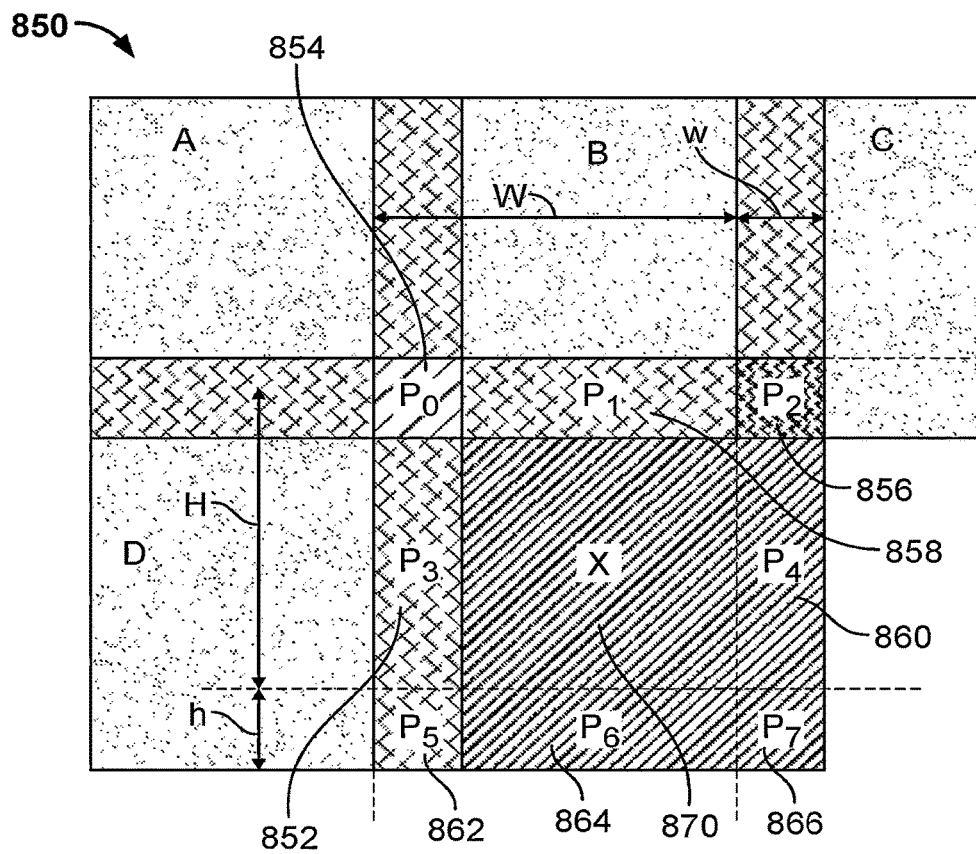

The diagrams of FIG. 8A-FIG. 8B depict OBDC with different OBDC patterns. For example, the diagram of FIG. 8A depicts an example clipped diamond pattern 810. The diagram of FIG. 8B depicts an example block pattern 850. A block may be extended using either method from size W×H, where W represents the width and H represents the height of the block by w pixels horizontally and h pixels vertically on the right and bottom directions. These extensions can correspond to the overlapping areas with future blocks. In a coding system, for the original block of size W×H, motion compensation may be performed, and the residual information generated, given the motion information derived for that block, along with the motion information derived from its neighboring partitions that overlap with this region. The residual may then be transform coded, quantized, and entropy encoded. The residual can be decoded without requiring information from future blocks within the image. For example, samples in the region $P_0$ 854, $P_1$ 858, $P_2$ 856, and $P_3$ 852 within FIG. 8B can be predicted as:

$$\text{value}_{y \in P_0} = w(\text{dist}_{y \in P_0, A}) \times \text{MCPvalue}(\overrightarrow{MV_A}) + w(\text{dist}_{y \in P_0, B}) \times \text{MCPvalue}(\overrightarrow{MV_B}) + w(\text{dist}_{y \in P_0, D}) \times \text{MCPvalue}(\overrightarrow{MV_D}) + w(\text{dist}_{y \in P_0, X}) \times \text{MCPvalue}(\overrightarrow{MV_X}) \quad \text{Eq. (2)}$$

$$\text{value}_{y \in P_1} = w(\text{dist}_{y \in P_1, B}) \times \text{MCPvalue}(\overrightarrow{MV_B}) + w(\text{dist}_{y \in P_1, X}) \times \text{MCPvalue}(\overrightarrow{MV_X}) \quad \text{Eq. (3)}$$

$$\text{value}_{y \in P_2} = w(\text{dist}_{y \in P_2, B}) \times \text{MCPvalue}(\overrightarrow{MV_B}) + w(\text{dist}_{y \in P_2, C}) \times \text{MCPvalue}(\overrightarrow{MV_C}) + w(\text{dist}_{y \in P_0, X}) \times \text{MCPvalue}(\overrightarrow{MV_X}) \quad \text{Eq. (4)}$$

$$\text{value}_{y \in P_3} = w(\text{dist}_{y \in P_3, A}) \times \text{MCPvalue}(\overrightarrow{MV_A}) + w(\text{dist}_{y \in P_3, X}) \times \text{MCPvalue}(\overrightarrow{MV_X}) \quad \text{Eq. (5)}$$

The prediction of regions $P_4$ 860, $P_5$ 862, $P_6$ 864, and $P_7$ 866 is constructed after the motion for the adjacent regions has been derived. The predictions of regions $P_0$ 854, $P_1$ 858, $P_3$ 852, and other areas from X 870, apart from $P_2$ 856, $P_4$ 860, $P_5$ 862, $P_6$ 864, and $P_7$ 866, which utilize, in the case of single list prediction, a single motion vector ($\overrightarrow{MV_X}$), are considered in generating the residual error for the current block. This concept can be extended for bi-prediction, with two motion vectors for each partition (e.g., as used in B coded pictures), and multi-hypothesis prediction.

Figure 9:
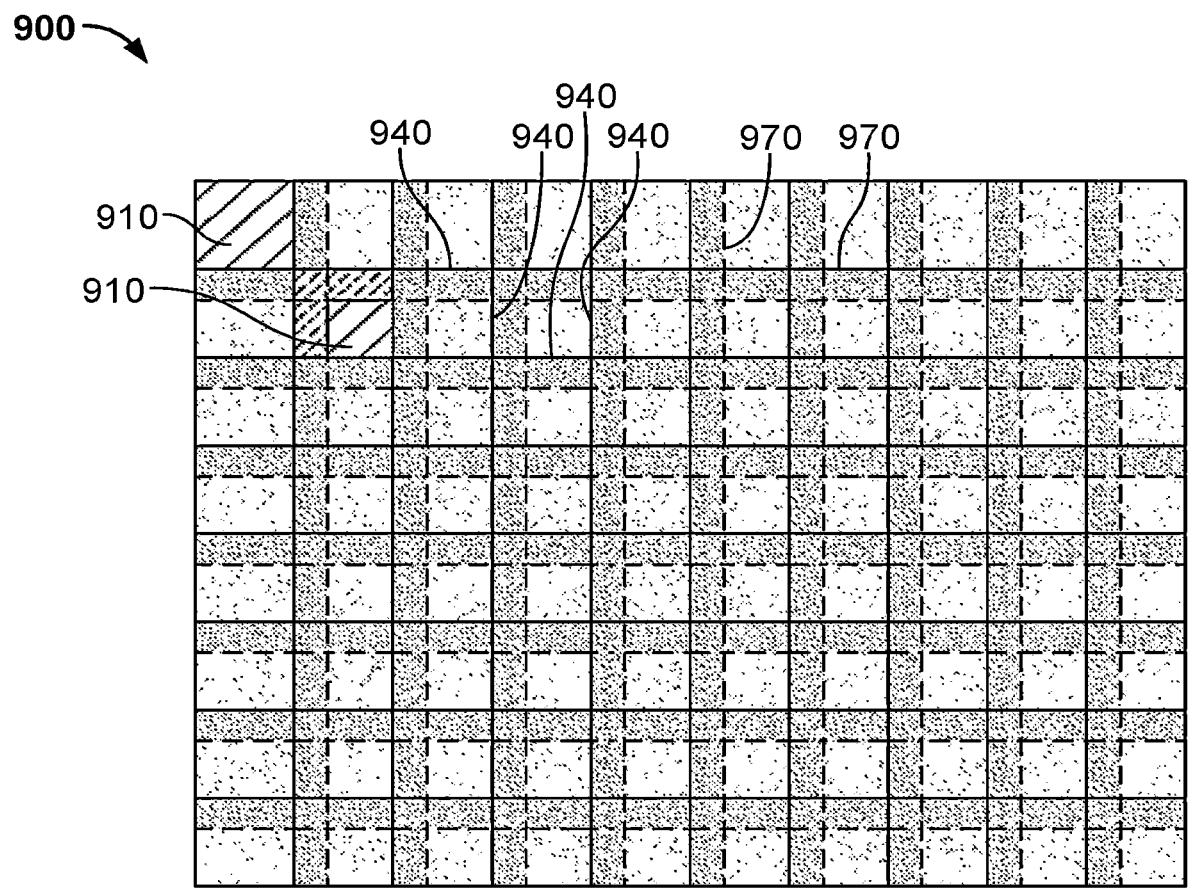
FIG. 9 depicts a diagram of an example OBDC embodiment.

FIG. 9 depicts a diagram of an example OBDC embodiment that uses causal overlapping areas. FIG. 9 depicts an example that can obviate dependencies on "future" or neighboring blocks. For example, overlapping is considered on the left and top boundaries of the blocks. The lighter areas (as depicted) are predicted with one sample. The darker areas (e.g., the overlapped areas) have predictions from two or four samples.

Some embodiments may support intra coding, including intra prediction. For instance, the pixels of a block can be predicted using a variety of techniques that consider already available and reconstructed samples from neighboring regions. As an example, a block can be predicted using the first column samples from the left neighbor block (horizontal prediction), the samples of the last row of the above neighbor block (vertical prediction), or using various combinations of such samples. After prediction, the residual signal can be computed, transformed, quantized, and entropy encoded. For each block, a signal can be provided that defines the intra prediction method that is to be used for the current block.

In some embodiments, a block can be coded without using a transform. If transform coding is skipped for a block (e.g., for a skipped block or for a block that no transformed residuals are present) then it may be deemed as being transform coded (or may be fully represented for reconstruction purposes). In these aspects, transformed residuals are present for the one or more neighboring blocks for which the presence of a transformed residual is signaled in the bit stream. In some embodiments, the transform may be linked with the residual information, and if no residual information is present, then no transform may be involved.

Figure 10:
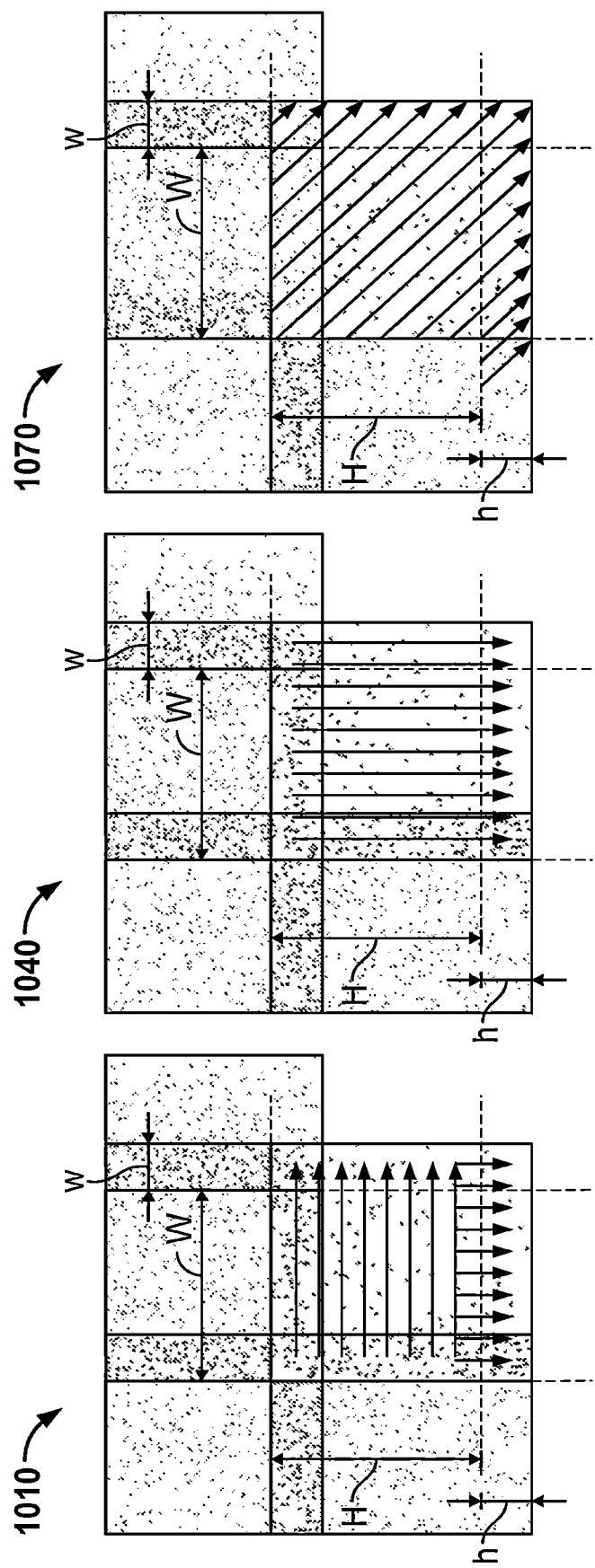
FIG. 10A depicts a diagram of intra prediction with overlapping considerations using horizontal prediction.
FIG. 10B depicts a diagram of an example of intra prediction with overlapping considerations using vertical prediction.
FIG. 10C depicts a diagram of an example of intra prediction with overlapping considerations using diagonal prediction.

Employing a similar technique as described above for inter prediction, some embodiments may use overlapped block disparity compensation for predicting intra regions, as described for example with reference to FIG. 10A-FIG. 10C.

FIG. 10A depicts a diagram 1010 of intra prediction with overlapping considerations using horizontal prediction. FIG. 10B depicts a diagram 1040 of intra prediction with overlapping considerations using vertical prediction. FIG. 10C depicts a diagram 1070 of intra prediction with overlapping considerations using diagonal prediction. In FIGS. 10A-C, the prediction modes can differ for each of the figures, and OBDC can be used with spatial boundaries.

For example, in FIG. 10B, a block of size (W+w)×(H+h) is predicted using a predefined intra prediction mechanism, e.g., $\text{Pred}_A$. After prediction, the residual of the upper left region of size W×H is computed, transformed and its coefficients quantized. The inverse process is applied to this information to generate the reconstructed residual, which is then added to the prediction of the upper left region. Then, the next region of size (W+w)×(H+h) is predicted, e.g., $Pred_B$. However, the prediction of the first w×(H+h) pixels is also affected and possibly enhanced by the original prediction of its left neighbor. More specifically, the final prediction of these samples can be generated by considering (e.g., via using weighted averaging=>$Pred_{Final}$=$w_A$×$Pred_A$+ $w_B$×$Pred_B$) the predictions utilized from previously coded and adjacent partitions, and the prediction as dictated by the coding mode of this block.

In some embodiments, the prediction direction of the neighboring partitions are considered independent of the prediction samples utilized for these partitions. Using these directions, multiple predictions for overlapping regions can be generated. The multiple predictions can be combined with the region signaled for the macroblock to generate the final prediction.

For instance, assume that for a block X, its top-left neighboring block uses DC prediction, the neighboring blocks above and above to the right of block X uses vertical prediction, and the neighboring block on the right of block X uses horizontal prediction, while X signals vertical prediction. In this example, the prediction samples can be generated by combining the prediction samples generated by each one of these directions separately and then averaging them together. Averaging could be done using equal weights, while we may also average the samples by giving a significant weight ($W_x$) to samples predicted directly from X compared to the weights for all other prediction samples. In some embodiments, $W_x$=4×$W_{neighbor}$ where $W_{neighbor}$ represent the weights for the neighbors. This process is a multi-hypothesis intra prediction method with low signaling overhead. Intra and inter predictions could also be combined using OBDC techniques. For example, some pixels within a block can be predicted using both inter and intra mechanisms, depending on the prediction method used for the neighboring partitions.

In some embodiments, overlapping and non-overlapping prediction blocks can be used within the same picture. A prediction block can be signaled as overlapping or non-overlapping within the bit stream through the addition of a signal element, or the prediction block can be derived through semantics or relationships with other blocks in the bit stream. For example, whether a prediction block uses overlapped prediction or not may be determined by associating the block with a reference index that points to a reference picture that is associated with OBDC coding. For some modes, which do not transmit any parameters (e.g., the SKIP or DIRECT modes supported in the H.264/AVC standard), a determination can be made on whether OBDC is used based on the neighboring partitions. For example, if all (or substantially all or most) partitions use OBDC, then OBDC could also be utilized by the current partition. Otherwise, normal prediction can be used.

In some embodiments, if neighbors in a given direction, or if neighbors on a side or above (or below) utilize OBDC, then OBDC is also used for the current block.

Figure 11:
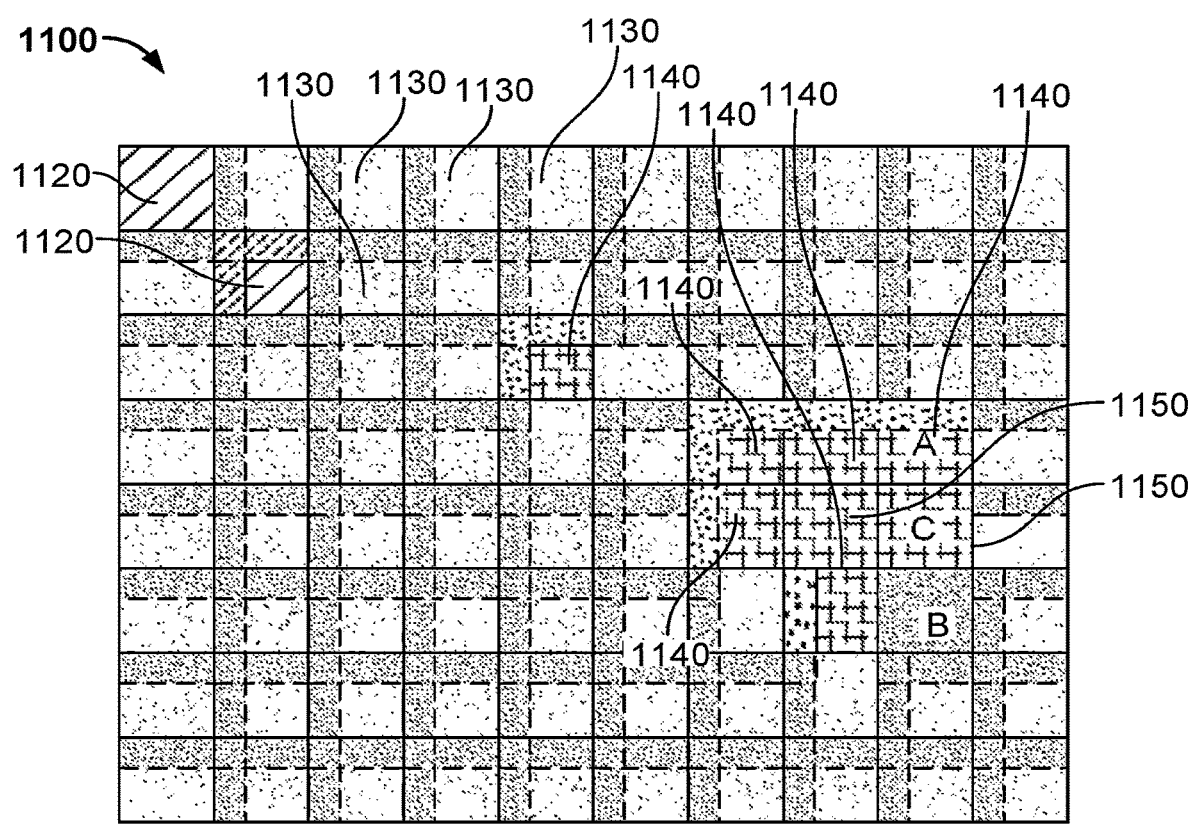
FIG. 11 depicts a diagram of an example of adaptively utilizing OBDC within a picture.

FIG. 11 depicts a diagram 1100 of an example of adaptively utilizing OBDC within a picture. For example, FIG. 11 depicts a mixed embodiment that has the above described causal variation of OBDC used for other blocks, overlapping prediction blocks without prediction propagation, and blocks that do not consider OBDC. The different types of techniques depicted in FIG. 11 can provide various ways to handle block boundaries. For example, OBDC may be used for blocks with small differences between neighboring blocks. OBDC may thus be used for blocks that differ slightly from their neighbors, and other techniques used for blocks where larger differences between the block boundaries exist. This situation can occur, for example, if there is a boundary between two objects in the image and there is a large difference in the block boundary. In this example situation, OBDC may be deterred or disabled for those block boundaries. In some embodiments, OBDC prediction could also be disabled or constrained on boundaries between partitions that use different prediction types. For example, if the current block is using bi-prediction but one of its neighbors is using a single list prediction, then OBDC may be only considered for the common list prediction. If the blocks use different lists, then OBDC may not be considered.

Some blocks in FIG. 11 can have internal overlapping of regions and external overlapping with regions. Internal overlapping can involve performing OBDC within a macroblock and using the block partitioning of that macroblock. External overlapping with OBDC can involve using the block partitioning of neighboring macroblocks. In some embodiments, internal overlapping can involve one prediction, and external overlapping can involve multiple predictions. FIG. 11 has transform blocks 1120 and overlapping OBDC blocks 1130. In some embodiments, the OBDC blocks 1130 may extend OBDC towards the right and bottom of the respective block. FIG. 11 also has overlapping prediction blocks 1140 with no prediction propagation. These overlapping prediction blocks 1140 can utilize prediction samples from neighboring blocks, and may not extend prediction to future blocks. Some blocks may not have OBDC (e.g., blocks with no OBDC for internal or external pixels, and no OBDC for future pixels).

In some embodiments, a restriction may be applied on how overlapping is used. For example, a block coding mode may be signaled for a block according to which overlapping can be performed using information, such as motion vectors (MVs) and illumination parameters, from previously coded adjacent partitions. The block coding may be signaled independently of the information of the current partition. OBDC prediction may also be independent of information from other partitions (e.g., Block A in FIG. 11).

In some embodiments, another type of OBDC block mode can signal that OBDC is not considered internally within the current block (e.g., Block B in FIG. 11), and that previously coded partitions do not provide prediction information for the current block regardless of their coding mode. This type of OBDC block mode may be allowed to utilize prediction information from the current block for other, not yet coded neighboring blocks. In FIG. 11, an additional coding mode can be introduced in the same context, which deters, if signaled, consideration of OBDC processing for prediction (e.g., Block C in FIG. 11). Selectively using OBDC on fewer than all blocks may conserve computational resources and promote efficiency.

Figure 12A:
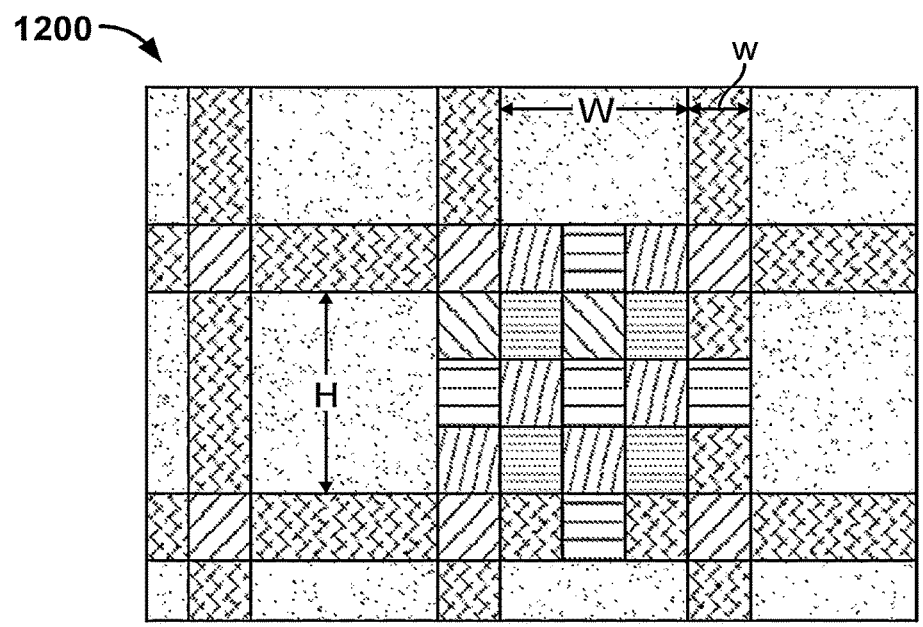
FIGS. 12A-D depict example OBDC embodiments with variable block sizes.
Figure 12B:
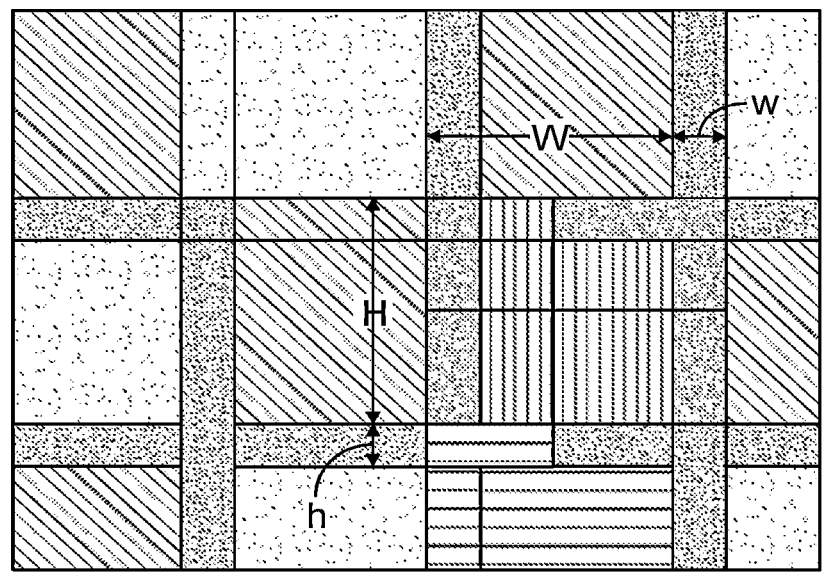
Figure 12C:
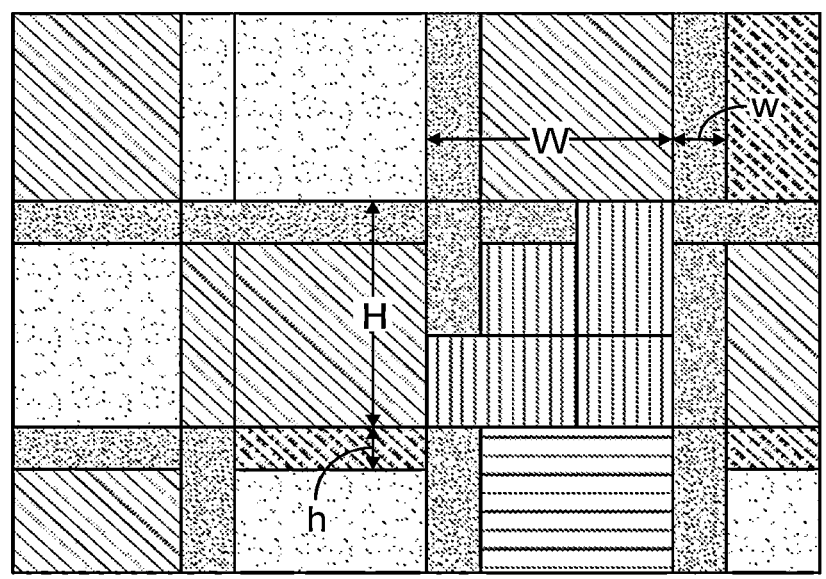
Figure 12D:
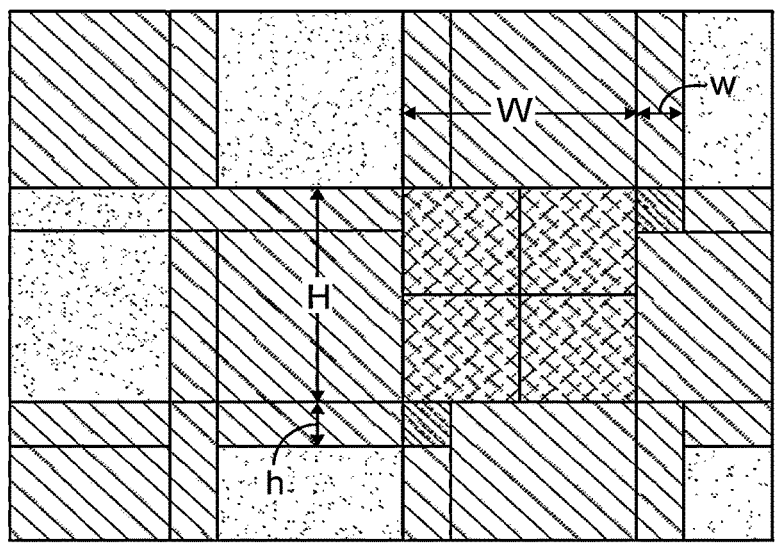

FIGS. 12A-D depict example OBDC embodiments with variable prediction block sizes. FIG. 12A depicts OBDC for external and internal block edges. FIG. 12B depicts OBDC for external block edges. FIG. 12C depicts OBDC used where a block's neighbor can include an overlapping mode block. FIG. 12D depicts OBDC for overlapping mode blocks. Some of these variable blocks, for example, can have a block size equal to 4×4 pixels, 8×8 pixels, or 16×16 pixels.

In the blocks of FIG. 12A-FIG. 12D, the region of overlapping can also vary based on the block size, or the region could remain the same from block to block. Where the region does not change from block to block, additional control may be obviated. In some embodiments, OBDC may be used at macroblock boundaries to reduce complexity, for example, as depicted with diagram 1225 of FIG. 12B. In some other embodiments, OBDC-based prediction may not occur with previously-encoded neighbors that have been predicted using partition modes of a certain size (e.g., smaller than 16×16 as in FIG. 12C), or certain prediction modes (e.g., intra prediction). In other embodiments, OBDC may not be used where a current block itself is of a particular prediction mode, e.g., not 16×16 (FIG. 12D).

Although raster-scan encoding may be commonly considered in many video coding systems, different coding orders can also be considered for a variety of reasons, such as for coding efficiency, error resiliency, etc. The proposed OBDC scheme can be extended to support these cases by applying overlapped prediction for blocks that have not yet been transform coded. For example, block (or region) N can be predicted using OBDC by utilizing prediction from these N−1 blocks (or regions). The prediction for block (or region) N can be conducted by considering which blocks (or regions) within this N−1 block (or region) set are neighboring blocks (or regions) to block (or region) N. Also, block (or region) N can provide prediction information for all its surrounding blocks (or regions) that have not yet been coded. In some embodiments, for example, there can be prediction using OBDC with N−1 blocks (or regions) that may follow a fixed coding order (e.g., raster scan, spiral, zig-zag, etc.) or an arbitrary coding order.

Figure 13:
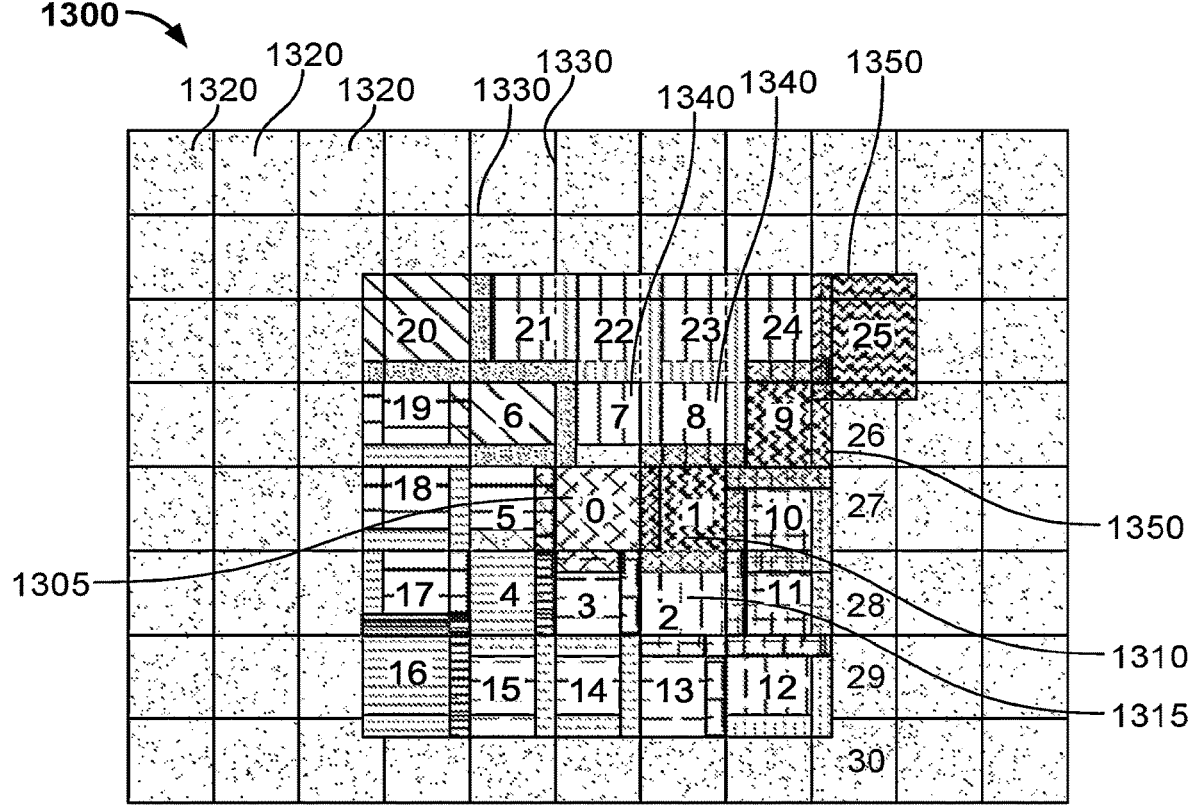
FIG. 13 depicts an example OBDC embodiment with a spiral macroblock coding order.

FIG. 13 depicts an example OBDC embodiment with a spiral-based macroblock coding order. FIG. 13 depicts transform blocks 1320, a transform grid 1330, prediction blocks 1340, and overlapping areas 1350. For the first block 1305 OBDC can be considered in all directions around this block. For a second block 1310, which is located on the right of the first block 1305, OBDC is considered for the not yet encoded regions on the right, top, and bottom. Similarly for a third block 1315, OBDC prediction is extended to the not yet encoded regions on the right, left, and bottom.

Figure 14:
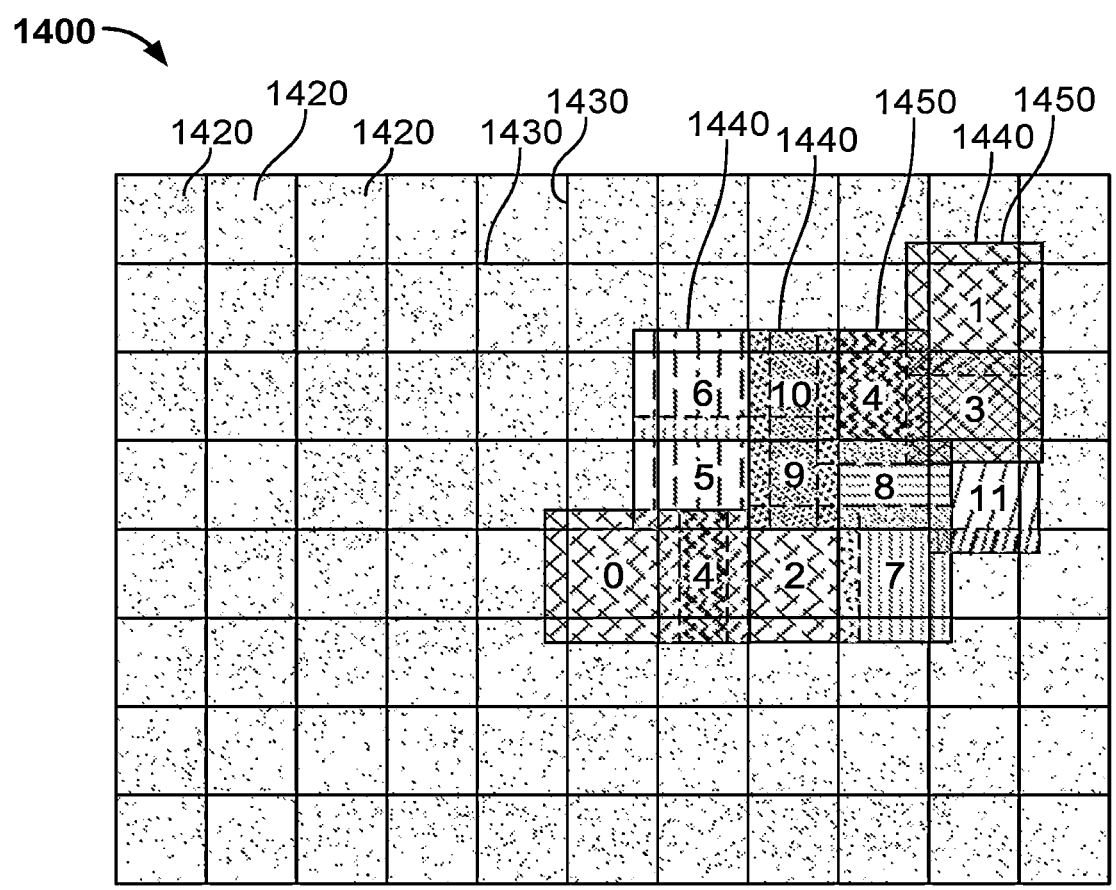
FIG. 14 depicts an example OBDC embodiment with a random macroblock coding order.

FIG. 14 depicts an example OBDC embodiment with a random macroblock coding order. For example, FIG. 14 depicts transform blocks 1420, a transform grid 1430, prediction blocks 1440, and overlapping areas 1450. FIG. 14 depicts a random coding order where the OBDC prediction is considered for regions not yet encoded. In such scenarios, the shape and size of the prediction block can be dynamic. The OBDC shape can be fixed, e.g., a rectangle or similar configuration, or can be variable depending on whether a neighboring block has or has not been encoded.

Figure 15:
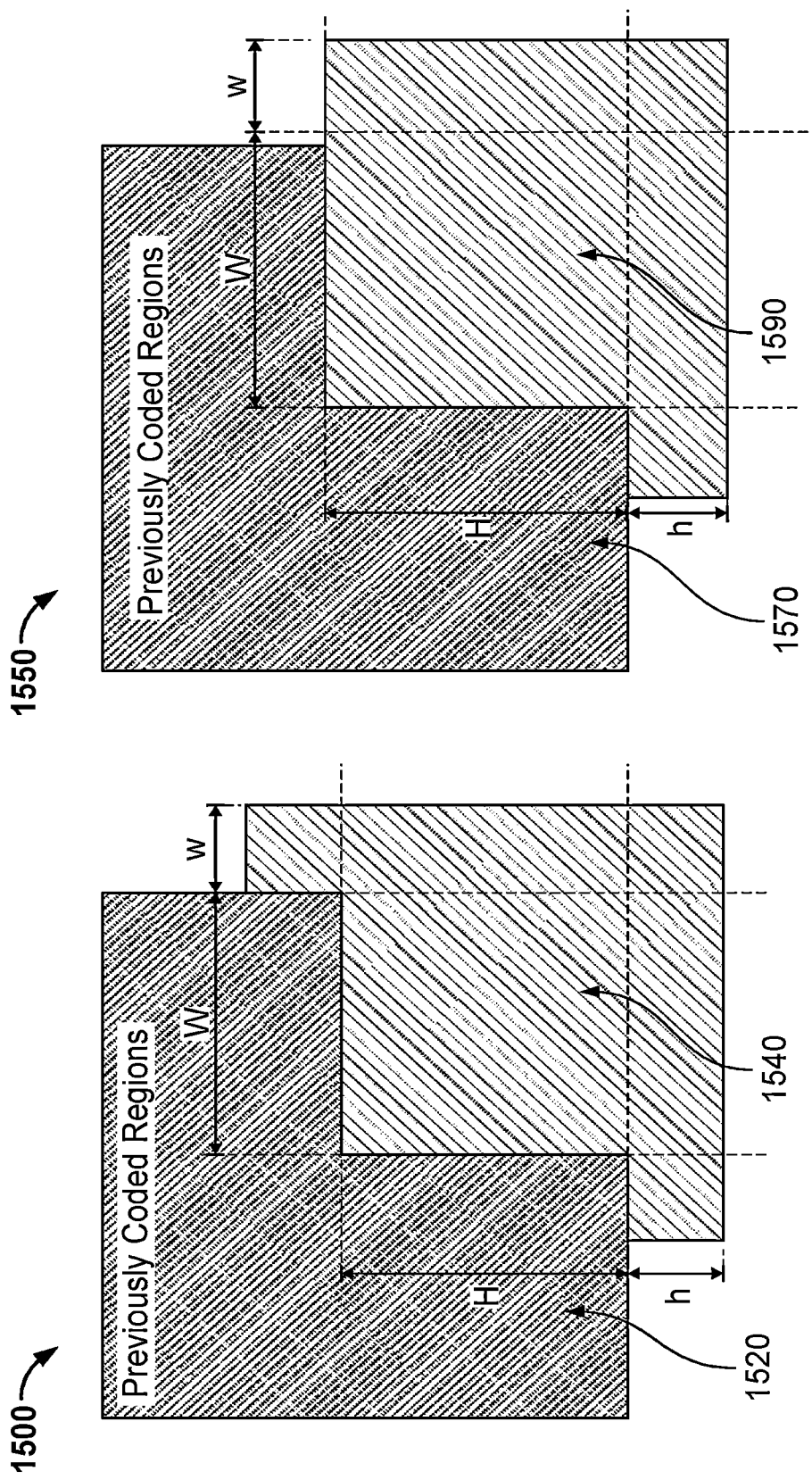
FIGS. 15A-B depict diagrams with examples where the shape of the OBDC prediction is dependent upon regions that have been previously encoded.

FIGS. 15A-B depict diagrams 1500, 1550 with examples where the shape of the OBDC prediction is dependent upon regions that have been previously encoded. In FIG. 15A, the previously coded regions 1520 are to the upper left of the block 1540. In FIG. 15B, the previously coded regions 1570 are to the top and upper left of the block 1590. In some embodiments, the OBDC shape can vary depending on the encoding of a neighboring block.

In some embodiments, the size and shape of the OBDC block, and the weighting applied to the different predictions can be based on the disparity compensation parameters (e.g., motion vectors, reference indices or the temporal distance or some other relationship between these references, or/and illumination parameters) of adjacent partitions. For example, OBDC block characteristics and weighting may be computed according to equation (3), below $$\text{value}_{y_0} = \sum_k w_k(\text{dist}_{y_0, \text{block}_k}) \times f_k(\overrightarrow{MV_{\text{block}_k}}, \overrightarrow{MV_X}) \times NCPvalue(\overrightarrow{MV_{\text{block}_k}}), \quad \text{Eq. (3)}$$

where functions $f_k(\overrightarrow{MV_{\text{block}_k}}, \overrightarrow{MV_X})$ depend on the motion and weighting parameter relationships between X and its neighboring blocks.

For example, a significant difference in the motion vectors of block X and block with $k_{index\ 0}$ may imply that block X and the block with $k_{index\ 0}$ differ significantly as well. Moreover, a significant difference in the motion vectors of two or more blocks may imply a significant probability that the respective motion vectors of each block may relate to (e.g., be based on) different objects or other image features. This may imply that the usefulness of OBDC, under these constraints, may be somewhat limited. In some embodiments, the function $f_0(\overrightarrow{MV_{\text{block}_0}}, \overrightarrow{M_X})=0$ may be used. Where the motion vectors are significantly (e.g., substantially) similar, e.g., where the difference between motion vectors is below a threshold, T: $\|\overrightarrow{MV_{\text{block}_0}} - \overrightarrow{M_X}\| < T$, the prediction from $\text{block}_0$ can be considered to have greater significance and the weighting of $\text{block}_0$ can be correspondingly increased. In some embodiments, these relationships and related weighting parameters could be pre-defined within the encoder and decoder. In some embodiments, these relationships and weighting parameters could be signaled and changed within the bit stream through, for example, defining and signaling new parameters in the sequence or picture parameter sets, or through the slice header of a video codec.

Figure 16:
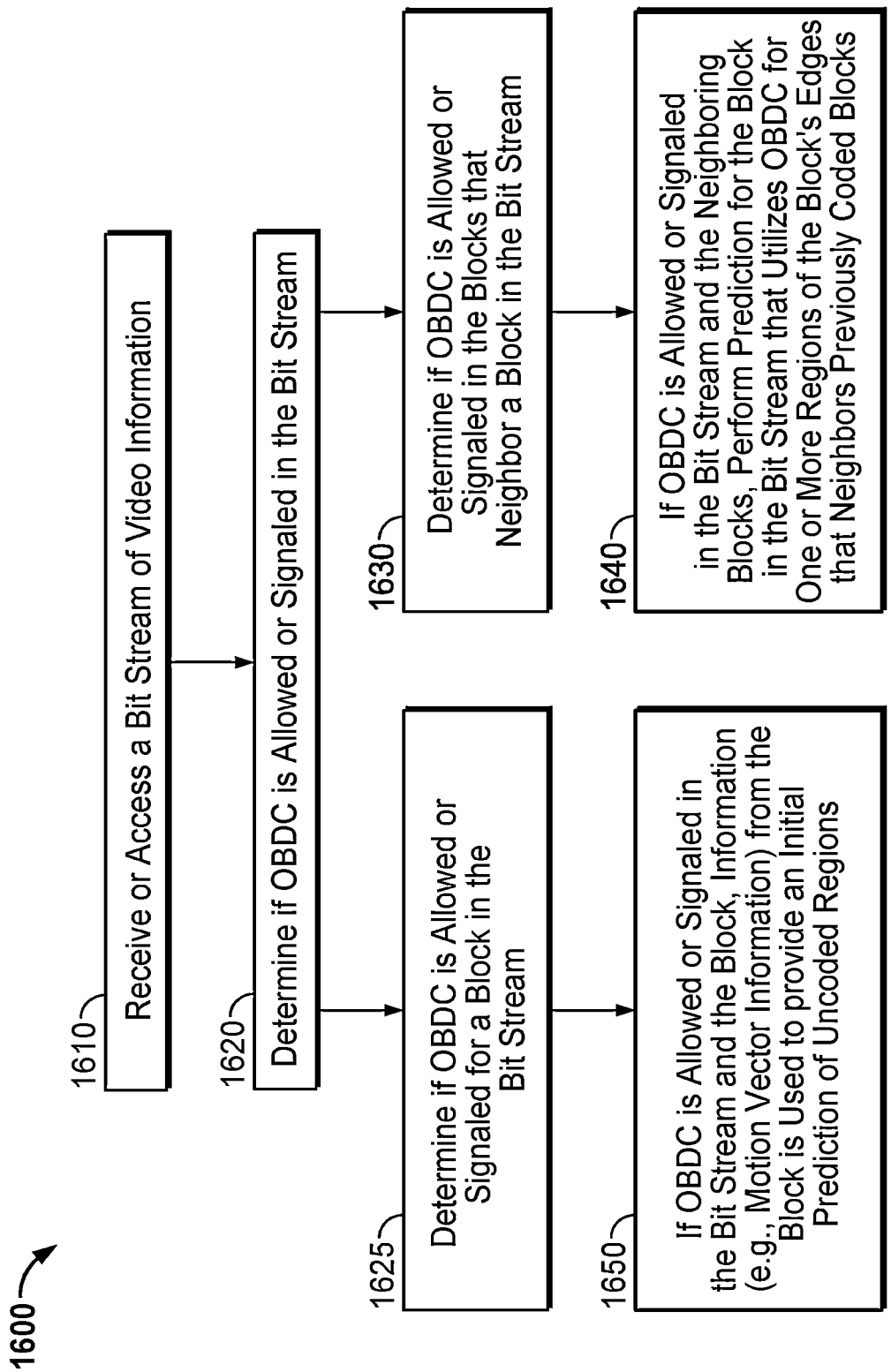
FIG. 16 depicts a flow chart of an example process for prediction using causal overlapping.

FIG. 16 depicts a flow chart with an example process 1600 for prediction using causal overlapping. The example process 1600 depicted in the flow chart involves receiving or accessing a bit stream of video information (1610). The process 1600 involves determining whether OBDC is allowed or signaled in a video bit stream (1620), and/or determining if OBDC is also allowed or signaled for blocks that neighbor a block in the bit stream (1630). If OBDC is allowed or signaled in the bit stream and the neighboring blocks, prediction can be performed for a block in the bit stream that utilizes OBDC for one or more regions of the block's edges that neighbors previously pre-coded blocks (1640). Further, if OBDC is allowed for the block in the bit stream (1625), information (e.g., motion vector information) from the block is used to provide an initial prediction of uncoded regions (1650).

OBDC can be allowed or signaled for the block and/or for the neighboring blocks based on, for example, one or more of the various OBDC allowance or signaling techniques (e.g., signaling via a signaling element in the bit stream, signaling via semantics or relations with other blocks in the bit stream, signaling via a reference index pointing to a reference picture, allowing/enabling OBDC when blocks are pre-coded, etc.) described within this disclosure. The flow chart of FIG. 16 can also be used with various coding orders (e.g., spiral, vertical, horizontal, arbitrary, raster scan, zig-zag, etc.) and/or other prediction techniques (e.g., inter prediction, intra prediction, prediction using multi-hypotheses, prediction with various amounts and types of dependencies on neighboring blocks, prediction with various types of overlapping, prediction with various types of propagation, prediction with various types of block sizes and block boundaries, etc.), as described within this disclosure. Some techniques can be used with the flow chart of FIG. 16 to causally perform overlapped disparity compensation as a function of the disparity compensation parameters, e.g., motion vectors, illumination change parameters among others, to provide motion and texture information to the bit stream.

The concepts of OBDC can also be utilized within codecs that support functionalities such as scalability or multi-view functionality. In these environments, apart from inter and intra prediction mechanisms, prediction can also be a cross-layer type prediction (e.g., prediction coming from a previously-decoded lower-quality or resolution version of the current image), or a cross-view type prediction (e.g., prediction coming from a previously-decoded image belonging to a different view). These predictions may have been previously modified before being used as predictions to correct for different errors or known disparities. Modifications of these predictions may include filtering, interpolation/scaling, and/or affine projection. OBDC could also be used when predicting from such references, while the conditions of utilizing OBDC or not utilizing OBDC for each block can be modified according to the characteristics of these references. For example, the weighting parameters for OBDC can be increased in a scalable video coding system for a prediction coming from a previous, lower-quality version of the same reference, or, for the multi-view video coding case, from a view that is closer in space than another view. Furthermore, it is also possible to consider sharing disparity compensation parameters between layers or views. For example, if a layer or view utilized OBMD, a higher layer or different view can copy, without signaling, the same OBMD parameters for its own prediction.

In one or more of the example embodiments disclosed herein, there can be a system, method, or a computer program product in which the intra coding and/or intra prediction includes any combination of vertical prediction, horizontal prediction, or diagonal prediction, and may employ template matching, a frequency domain method, and/or a spatial displacement method, among others. The inter prediction may include bi-predictive inter prediction and/or multi-hypothesis inter prediction. The macroblocks can have various shapes and patterns, such as an orthogonal pattern, a rectangular pattern, a square pattern, a diamond pattern, a circular pattern, and/or polygons with N number of edges. The prediction can also include a mesh-based prediction, in which the mesh-based prediction may have triangular shapes.

Figure 17:
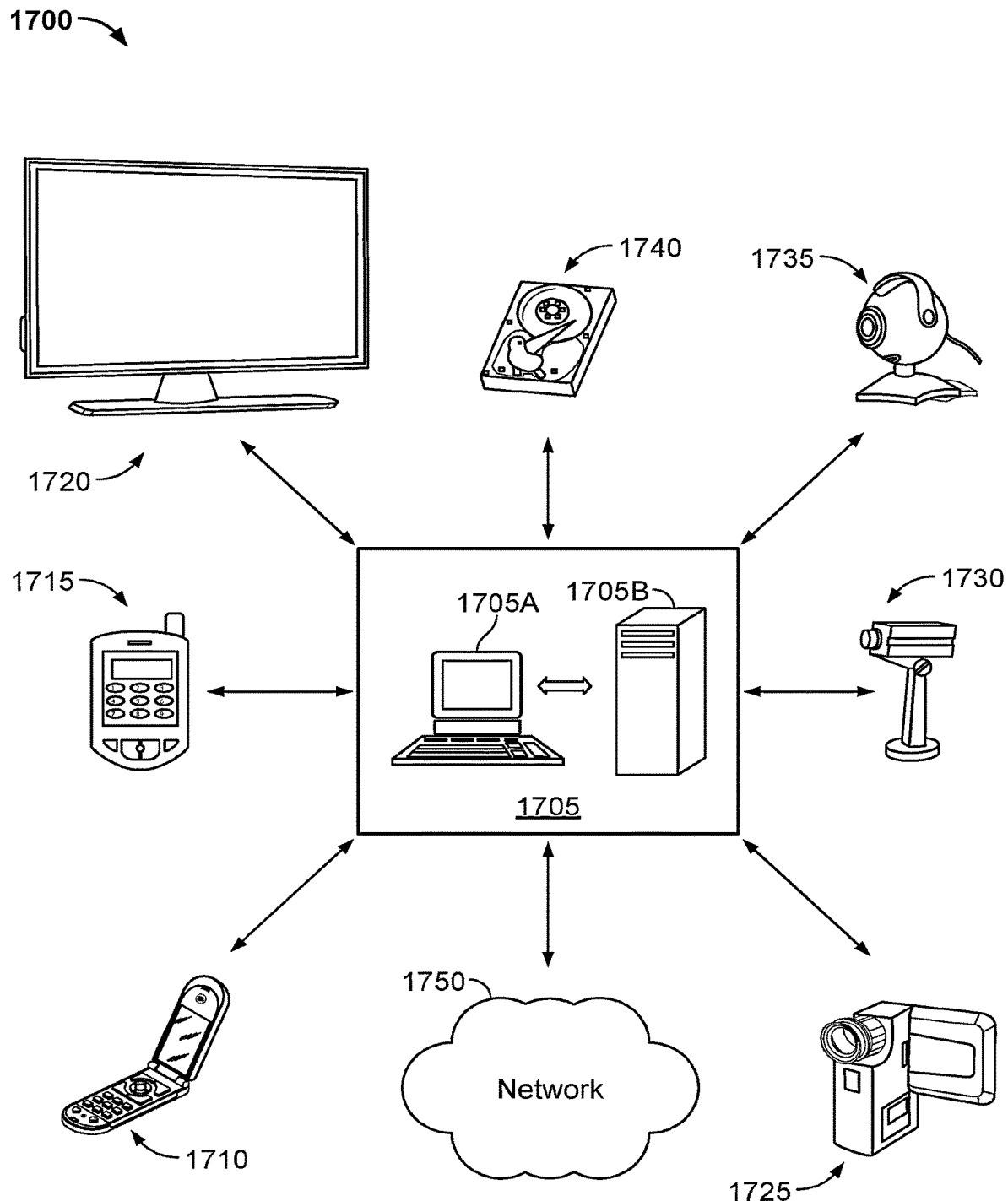
FIG. 17 depicts a system diagram of examples of display and/or image processing devices for the disclosed OBDC techniques.

FIG. 17 depicts an example system model. The disclosed techniques can be used on one or more computers 1705A, 1705B. One or more methods and/or algorithms and/or processes herein can be implemented with, or employed in computers and/or video display 1720, transmission, processing, and playback systems. The computers described herein may be any kind of computer, either general purpose, or some specific purpose computer such as a workstation. The computer 1705B may be, e.g., an Intel or AMD based computer, running Windows XP, Vista, or Linux, or may be a Macintosh computer. In some embodiments, the computer can also be, e.g., a handheld computer, such as a PDA 1715, cell phone 1715, or laptop 1705A. The computer may also refer to machines or parts of a machine for image recording or reception 1725, 1730, 1735, processing, storage 1740, and distribution of data, in particular video data.

Computer and/or graphic programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), Storage Area Network (SAN), or other removable medium. The programs may also be run over a network 1750, for example, with a server or other machine sending communications to the local machine, which allows the local machine to carry out the operations described herein.

Although only a few embodiments have been disclosed in detail above, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a computer readable medium for execution by, or to control the operation of, data processing apparatus. The computer readable medium can be a machine-readable storage device 1740, a machine-readable storage substrate, a memory device, a composition of matter effecting a machine-readable propagated, processed communication, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a graphical system, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows and figures described and depicted in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or another programmable logic device (PLD) such as a microcontroller or an ASIC (application specific integrated circuit).

Processors suitable for the execution of a computer program include, by way of example, both general and special purpose microprocessors, and any one or more processors of any kind of digital computer. Generally, a processor can receive instructions and data from a read only memory or a random access memory or both. The essential elements of a computer are a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, some embodiments of the subject matter described in this specification can be implemented on a computer having a display device, e.g., a CRT (cathode ray tube), LCD (liquid crystal display), or plasma display monitor 1720, for displaying information to the user and a keyboard and a selector, e.g., a pointing device, a mouse, or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Some embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an embodiment of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server can be remote from each other and interact through a communication network. The relationship of client and server can arise by virtue of computer programs running on the respective computers and having a client-server relationship to each other.

While this disclosure contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order depicted or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software or hardware product or packaged into multiple software or hardware products.

The term "algorithm" can refer to steps, methods, processes, schemes, procedures, operations, programs, guidelines, techniques, sequences, and/or a set of rules or instructions to achieve the results described herein. For example, an algorithm can be a set of video processing instructions for a hardware and/or software video processor. The disclosed algorithms can be related to video and can be generated, implemented, associated, and/or employed in video-related systems and/or any devices, machines, and/or articles of manufacture for the processing, compression, storage, transmission, reception, testing, calibration, display, and/or any improvement, in any combination, for video data.

An embodiment of the present invention may relate to one or more of the examples enumerated below.

1. A method for motion compensation of images with overlapped block disparity compensation (OBDC), the method comprising the steps of:
    determining if OBDC is enabled in a video bit stream;
    determining if OBDC is enabled for one or more macroblocks that neighbor a first macroblock within the video bit stream, wherein the one or more neighboring macroblocks are transform coded; and
    if OBDC is enabled in the video bit stream and for the one or more neighboring macroblocks, performing prediction for a region of the first macroblock that has an edge adjacent with the one or more neighboring macroblocks.
2. The method of enumerated example embodiment 1, wherein the step of determining if OBDC is enabled for the video bit stream or the one or more macroblocks comprises any combination of the steps of: detecting a signaling instruction within the bit stream or the one or more macroblocks to enable OBDC; determining a semantic or relationship in the bit stream or the one or more macroblocks to enable OBDC; determining neighboring block information or differences in motion vectors to enable OBDC; or detecting an association of the one or more macroblocks with a reference index that points to a reference picture that is associated with OBDC coding.
3. The method of enumerated example embodiment 1, further comprising the step of applying a coding order.
4. The method of enumerated example embodiment 3, wherein the step of applying the coding order comprises utilizing a raster scan coding order, a horizontal coding order, a vertical coding order, an arbitrary coding order, or a zig-zag coding order.

5. The method of enumerated example embodiment 1, further comprising the step of applying another type of prediction to the OBDC prediction.

6. The method of enumerated example embodiment 4, wherein the other type of prediction comprises inter prediction, intra prediction, cross-layer prediction, cross-view prediction, prediction using multi-hypothesis, or prediction with dependencies for the one or more neighboring macroblocks.

7. The method of enumerated example embodiment 4, wherein the other type of prediction further comprises prediction with a type of overlapping, prediction with a type of propagation, prediction that is independent of information of future macroblocks, or prediction with a plurality of macroblock sizes or macroblock boundaries.

8. The method of enumerated example embodiment 4, wherein the type of overlapping comprises internal overlapping of the region of the first macroblock or external overlapping of the region of the first macroblock, wherein the internal overlapping of the region comprises overlapping the region using information from one or more pixels of the first macroblock, and the external overlapping of the region comprises overlapping the region using information from pixels of one or more regions of the one or more neighboring macroblocks.

9. The method of enumerated example embodiment 4, wherein the prediction with a type of propagation comprises prediction with propagation in a pre-determined direction.

10. The method of enumerated example embodiment 1, wherein the macroblocks form a rectangular pattern, a square pattern, a diamond pattern, or a circular pattern, and wherein the prediction extends in one or two directions for the pattern.

11. The method of enumerated example embodiment 1, wherein the macroblocks form an orthogonal pattern, or polygons with N number of edges.

12. The method of enumerated example embodiment 1, wherein the prediction comprises a mesh-based prediction, wherein the mesh-based prediction comprises triangular shapes.

13. The method of enumerated example embodiment 1, wherein the prediction extends in at least three dimensions.

14. The method of enumerated example embodiment 1, further comprising the steps of:
generating residual information from the prediction, the residual information including information for the first macroblock and the one or more neighboring macroblocks, wherein the residual information comprises motion information;
transform coding the residual information;
quantizing the transform coded residual information; and
entropy encoding the quantized information.

15. The method of enumerated example embodiment 7, further comprising the step of decoding the residual, wherein the step of decoding is independent of information from future macroblocks in an image of the video bit stream.

16. The method of enumerated example embodiment 8, wherein any of the predictions comprises one or more operations from filtering, interpolation, scaling, or affine projection.

17. The method of enumerated example embodiment 1, further comprising sharing one or more disparity compensation parameters or modes amongst one or more views or layers.

18. The method of enumerated example embodiment 1, further comprising copying one or more disparity compensation parameters or modes amongst one or more views or layers.

19. The method of enumerated example embodiment 1, further comprising the step of using information for the prediction of the region of the first macroblock to perform prediction for one or more regions of another neighboring macroblock, where the other neighboring macroblock is non-transform coded.

20. The method of enumerated example embodiment 1, wherein the step of performing the prediction comprises applying OBDC to a subset of directions that are available for prediction for the first macroblock.

21. The method of enumerated example embodiment 1, wherein transformed residuals are present for the one or more neighboring macroblocks for which a presence of a transformed residual is signaled in the video bit stream.

22. A method for motion compensation of images with overlapped block disparity compensation (OBDC), the method comprising the steps of:
determining if OBDC is enabled in a video bit stream;
determining if OBDC is enabled for a first macroblock within the video bit stream, wherein the first macroblock is transform coded, and wherein the first macroblock is adjacent to one or more neighboring macroblocks; and
if OBDC is enabled in the video bit stream and for the first macroblock, performing prediction for a region of the one or more neighboring macroblocks using information from the first macroblock, wherein the region comprises a non-transform coded region.

23. The method of enumerated example embodiment 22, wherein the information comprises motion vector information, texture information, or information associated with a pixel.

24. The method of enumerated example embodiment 22, wherein the step of determining if OBDC is enabled for the video bit stream or the first macroblock comprises one or more steps comprising: detecting a signaling instruction within the bit stream or the first macroblock to enable OBDC; determining a semantic or relationship in the bit stream or the first macroblock to enable OBDC; determining neighboring block information or differences in motion vectors to enable OBDC; or detecting an association of the first macroblock with a reference index that points to a reference picture that is associated with OBDC coding.

25. A method for disparity compensation of images with overlapped block disparity compensation (OBDC), the method comprising the steps of:
determining if OBDC is enabled in a bit stream of video information;
determining a first region of a first macroblock within the bit stream; and determining whether one or more residual regions in one or two macroblocks that are transform coded and adjacent to the first macroblock are enabled for overlapping prediction;

if the bit stream is enabled for OBDC and the one or more residual regions are enabled for overlapping prediction, predicting pixels in the first region of the first macroblock using motion vectors from only the one or more residual regions in the one or two adjacent macroblocks; and weighting the pixels in the first region as a function of a distance of the pixels from an area of the one or two adjacent macroblocks.

26. The method of enumerated example embodiment 25, wherein the prediction for the pixels comprises a causal prediction.

27. The method of enumerated example embodiment 26, wherein the weighting comprises a weighted average that is based on the distance.

28. The method of enumerated example embodiment 25, wherein the OBDC comprises computing a residual of the first macroblock that is independent of information from future macroblocks.

29. The method of enumerated example embodiment 25, wherein the first region is neighboring a first boundary of the first macroblock.

30. The method of enumerated example embodiment 25, wherein the overlapped motion compensation is computed independent of information from a future or adjacent macroblock.

31. The method of enumerated example embodiment 25, wherein the predicting step comprises intra coding or intra prediction.

32. The method of enumerated example embodiment 25, wherein the intra coding or intra prediction comprises one or more of vertical prediction, horizontal prediction, or diagonal prediction.

33. The method of enumerated example embodiment 25, wherein the intra coding or inter prediction comprises template matching, a frequency domain method, or a spatial displacement method.

34. The method of enumerated example embodiment 25, wherein the inter prediction comprises bi-predictive or multi-hypothesis inter prediction.

35. The method of enumerated example embodiment 25, wherein the predicting step comprises a combination of intra coding and inter prediction.

36. The method of enumerated example embodiment 25, further comprising signaling the one or more adjacent macroblocks with one or more of flags or semantics.

37. The method of enumerated example embodiment 25, wherein the prediction involves performing intra prediction and inter prediction.

38. The method of enumerated example embodiment 25, further comprising:

predicting pixels in one or more other regions; and combining the prediction of the first region with the prediction for the one or more regions, wherein the prediction comprises a coding mode for the macroblocks, wherein the coding mode comprises an arbitrary coding mode, a spiral coding mode, a random coding mode, a horizontal coding mode, a vertical coding mode, or a diagonal coding mode.

39. The method of enumerated example embodiment 25, further comprising combining one or more other types of predictions to the first region.

40. The method of enumerated example embodiment 25, wherein the macroblock comprises a block partition with a size that is different from a block partition size of a partition in at least one of the adjacent macroblocks.

41. The method of enumerated example embodiment 25, further comprising predicting information for other regions within a picture, the other regions comprising overlapping macroblock regions and non-overlapping macroblocks regions.

42. The method of enumerated example embodiment 25, wherein one or more of the macroblocks comprise transformed residuals for which a presence of at least one of the transformed residuals is signaled in the video bit stream.

43. The method of enumerated example embodiment 25, the method further comprises:

combining the prediction with another type of prediction from one of the adjacent macroblocks, wherein the other type of prediction comprises prediction using multi-hypotheses, or prediction with a plurality of block sizes or macroblock partition types; and applying weighting to the other type of prediction.

44. A computer program product, encoded on a computer-readable medium, comprising instructions to cause data processing apparatus to perform operations for overlapped block disparity estimation and compensation (OBDC) for images, the operations comprising:

for a plurality of macroblocks, performing OBDC prediction for at least a first subset of macroblocks by overlapping less than all block boundaries for the macroblocks in the at least first subset such that the OBDC prediction for the at least first subset is causal.

45. The computer program product of enumerated example embodiment 44, the operations further comprising:

performing OBDC prediction for a second subset of macroblocks that involves overlapping by overlapping all block boundaries for the macroblocks in the second subset; and combining the OBDC prediction for the at least first subset with the OBDC prediction for the second subset.

46. The computer program product of enumerated example embodiment 44, the operations further comprising:

performing a type of motion prediction for a second subset of macroblocks that differs from the OBDC prediction of the macroblocks in the at least first subset of macroblocks; and combining the OBDC prediction for the at least first subset with the type of prediction for the second subset.

47. The computer program product of enumerated example embodiment 44, wherein the operations for the combining comprises:

applying a weighting parameter to the OBDC prediction for the at least first subset or the type of prediction for the second subset.

48. The computer program product of enumerated example embodiment 44, the operations further comprising:

applying weighting to the at least first subset of macroblocks using the OBDC prediction; and applying a prediction mode to the OBDC prediction, wherein the prediction mode comprises an internal prediction, an external prediction, or a combination of internal and external OBDC prediction.

49. The computer program product of enumerated example embodiment 44, wherein the OBDC prediction comprises a coding mode for the at least first subset of macroblocks, wherein the coding mode comprises an arbitrary coding mode, a spiral coding mode a horizontal coding mode, a vertical coding mode, or a diagonal coding mode.

50. The computer program product of enumerated example embodiment 44, wherein the type of prediction for the second subset of macroblocks comprises intra prediction or inter prediction.

51. The computer program product of enumerated example embodiment, wherein the intra coding or intra prediction comprises one or more of vertical prediction, horizontal prediction, or diagonal prediction, template matching, a frequency domain method, or a spatial displacement method.

52. The computer program product of enumerated example embodiment 44, wherein the macroblocks form an orthogonal pattern, a rectangular pattern, a square pattern, a diamond pattern, a circular pattern, or polygons with a plurality of edges, and wherein the prediction extends in one or more dimensions.

53. The computer program product of enumerated example embodiment 44, wherein the prediction comprises a mesh-based prediction, wherein the mesh-based prediction comprises triangular shapes.

54. The computer program product of enumerated example embodiment 44 further comprising instructions associated with the OBDC prediction comprising computing a residual of the first macroblock that is independent of information from future macroblocks.

55. A system to perform motion estimation of images, the system comprising:
    a display device to display image data;
    a computer readable medium to store the image data and instructions for image data processing; and
    a data processing device operable to process the instructions and image data, the instructions causing the device to perform overlapped block disparity estimation (OBDC) for images, the operations comprising:
        for a plurality of macroblocks, performing OBDC prediction for at least a first subset of macroblocks by overlapping less than all block boundaries for the macroblocks in the at least first subset such that the OBDC prediction for the at least first subset is causal.

56. The system of enumerated example embodiment 55, wherein the instructions further comprise:
    performing a type of motion prediction for a second subset of macroblocks that differs from the OBDC prediction of the macroblocks of the at least first subset of macroblocks; and
    combining the OBDC prediction for the at least first subset with the type of prediction for the second subset.

57. The system of enumerated example embodiment 55, wherein the combining comprises taking a weighted average of the OBDC prediction for the at least first subset and the type of prediction for the second subset of macroblocks.

58. The system of enumerated example embodiment 55, wherein the plurality of macroblocks comprise macroblocks of various sizes, or macroblocks with partitions having a plurality of shapes or sizes.

59. The system of enumerated example embodiment 55, wherein the OBDC prediction is signaled explicitly or via of semantics to indicate whether OBDC prediction is to be used for a macroblock in the at least first subset of macroblocks.

60. The system of enumerated example embodiment 55, wherein one or more of the macroblocks comprise transformed residuals for which a presence of at least one of the transformed residuals is signaled in the video bit stream.

61. A system for disparity estimation and disparity compensation for video, the system comprising:
    a video encoder comprising one or more video encoder components for encoding that causally executes overlapped block disparity estimation and compensation (OBDC) to a subset of macroblocks in an image of a video bit stream, the one or more video encoder components comprising:
        a disparity estimation component to determine one or more prediction modes or prediction parameters; and
        a disparity compensation component to utilize disparity estimation component information to generate prediction information utilizing causally-executed OBDC for the subset of macroblocks; and
    a video decoder comprising one or more components for decoding, the one or more video decoder components to execute entropy decoding, execute disparity compensation, and generate residual information utilizing the causally-executed OBDC.

62. The system of enumerated example embodiment 61, wherein the one or more video decoder components are arranged to execute the entropy decoding, execute the disparity compensation, and generate the residual information in parallel.

Particular example embodiments of the disclosure have thus been described; other embodiments are within the scope of the following claims and equivalents.

What is claimed is:
1. An apparatus to encode a block motion compensated video bit stream, the apparatus comprising:
    an input for receiving input video; and a processor to encode the input video, wherein the processor:
        encodes a first block partition of an image of the input video;
        encodes a second block partition of the image, the second block partition being edge adjacent to the first block partition; and
        encodes an explicit signal, the explicit signal indicating a mode for the first block partition, wherein the mode is one of (i) a first mode that identifies the first block partition as being motion compensated by motion vector information of the second block partition, or (ii) a second mode that identifies the first block partition as being motion compensated by motion vector information of a third block partition without motion vector information of the second block partition.

2. The apparatus of claim 1, wherein at least a region of the first block partition overlaps with a region of the second block partition.

3. The apparatus of claim 1, wherein the processor includes a picture reference store.

4. The apparatus of claim 1, wherein the processor interacts with a remote client device over a communication network.

5. A block motion-compensated video bitstream stored in non-transitory memory, the video bitstream comprising:

a first block partition of an image of the video bitstream;

a second block partition of the image, the second block partition being edge adjacent to the first block partition; and an explicit signal, the explicit signal indicating a mode for the first block partition, wherein the mode is one of (i) a first mode that identifies the first block partition as being motion compensated by motion vector information of the second block partition, or (ii) a second mode that identifies the first block partition as being motion compensated by motion vector information of a third block partition without motion vector information of the second block partition.

6. The block motion-compensated video bitstream of claim 5, wherein the non-transitory memory is a mobile telephone's non-volatile memory.

7. An apparatus to decode a block motion compensated video bit stream, the apparatus comprising:

an input for receiving a coded video bitstream; and a processor to decode the coded video bitstream to generate one or more output video pictures, wherein the processor:

receives a first block partition of an image in the coded video bitstream;

receives a second block partition of the image, the second block partition being edge adjacent to the first block partition;

receives an explicit signal, the explicit signal indicating a mode for the first block partition, wherein the mode is one of (i) a first mode that identifies the first block partition as being motion compensated by motion vector information of the second block partition, or (ii) a second mode that identifies the first block partition as being motion compensated by motion vector information of a third block partition without motion vector information of the second block partition; and decodes the first block partition based on the explicit signal.

8. The apparatus of claim 7, wherein at least a region of the first block partition overlaps with a region of the second block partition.

* * * * *